(12) United States Patent
Jin et al.

(10) Patent No.: US 12,689,590 B2
(45) Date of Patent: Jul. 21, 2026

(54) COMMUNICATION METHOD AND DEVICE

(71) Applicant: Huawei Technologies Co., Ltd., Shenzhen (CN)

(72) Inventors: Hui Jin, Shenzhen (CN); Fenghui Dou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 243 days.

(21) Appl. No.: 18/478,669

(22) Filed: Sep. 29, 2023

(65) Prior Publication Data

US 2024/0031298 A1 Jan. 25, 2024

Related U.S. Application Data

(63) Continuation of application No. PCT/CN2022/083757, filed on Mar. 29, 2022.

(30) Foreign Application Priority Data

Apr. 9, 2021 (CN) .......................... 202110383278.1
Jun. 11, 2021 (CN) .......................... 202110654668.8

(51) Int. Cl.
*H04L 47/24* (2022.01)

(52) U.S. Cl.
CPC .................................... *H04L 47/24* (2013.01)

(58) Field of Classification Search
CPC ........................... H04L 47/24; H04W 28/0268
See application file for complete search history.

(56) References Cited

U.S. PATENT DOCUMENTS

| | | | | |
|---|---|---|---|---|
| 11,134,419 | B2 * | 9/2021 | Huang-Fu | H04W 28/0257 |
| 11,832,340 | B2 * | 11/2023 | Dou | H04W 72/54 |
| 2015/0023366 | A1 | 1/2015 | Lai et al. | |
| 2015/0229970 | A1 | 8/2015 | Ma et al. | |
| 2015/0373075 | A1 * | 12/2015 | Perlman | H04L 65/762 |
| | | | | 709/217 |
| 2019/0132251 | A1 * | 5/2019 | Dao | H04L 69/22 |
| 2020/0120738 | A1 * | 4/2020 | Kawasaki | H04W 76/18 |
| 2020/0196133 | A1 * | 6/2020 | Kawasaki | H04W 76/12 |
| 2020/0196382 | A1 * | 6/2020 | Kawasaki | H04L 67/14 |
| 2020/0267606 | A1 * | 8/2020 | Huang-Fu | H04W 28/0257 |
| 2020/0275302 | A1 * | 8/2020 | Youn | H04W 28/24 |
| 2020/0389811 | A1 * | 12/2020 | Guo | H04W 76/20 |
| 2021/0051562 | A1 | 2/2021 | Huang-Fu et al. | |
| 2021/0136589 | A1 * | 5/2021 | Kawasaki | H04W 12/08 |

(Continued)

FOREIGN PATENT DOCUMENTS

| | | |
|---|---|---|
| WO | 2020077607 A1 | 4/2020 |
| WO | 2022000171 A1 | 1/2022 |

*Primary Examiner* — David R Lazaro
(74) *Attorney, Agent, or Firm* — Slater Matsil, LLP

(57) ABSTRACT

This application relates to a communication method and device. The method includes receiving a first traffic flow and sending the first traffic flow by using at least two QoS flows. The first traffic flow corresponds to an application transmitted by using the at least two QoS flows. For example, different QoS flows may be used to transmit data packets of different importance degrees. In this way, the data packets of different importance degrees can be separately controlled, for example, sending of a more important data packet is preferentially ensured, to improve transmission reliability of these data packets, and ensure service experience of a user.

20 Claims, 7 Drawing Sheets

(56)          References Cited

U.S. PATENT DOCUMENTS

| | | | | |
|---|---|---|---|---|
| 2021/0352521 | A1* | 11/2021 | Pan | H04L 47/805 |
| 2021/0360501 | A1* | 11/2021 | Jin | H04W 36/0022 |
| 2022/0007264 | A1* | 1/2022 | Takakura | H04W 76/18 |
| 2024/0031298 | A1* | 1/2024 | Jin | H04L 47/24 |

* cited by examiner (a) Indication information 1

(b) QRI (c) QFI 1

(d) (Optional) set of packet filters (e) Precedence value (f) QFI 2

FIG. 4B (a) Indication information 1

(b) QRI (c) QFI 1

(d) (Optional) set of packet filters (e) Precedence value (f) I frame and P0 frame

FIG. 4C

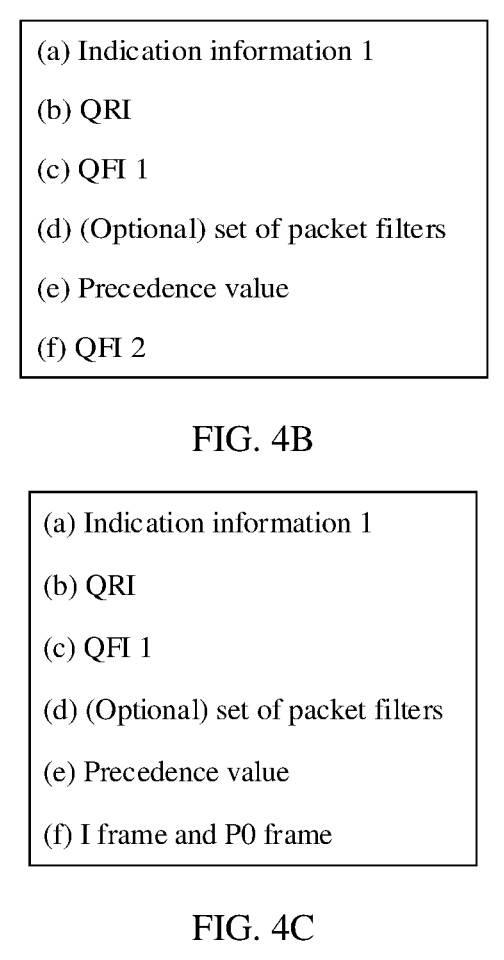

COMMUNICATION METHOD AND DEVICE

CROSS-REFERENCE TO RELATED APPLICATIONS

This application is a continuation of International Application No. PCT/CN2022/083757, filed on Mar. 29, 2022, which claims priority to Chinese Patent Application No. 202110383278.1, filed on Apr. 9, 2021, and Chinese Patent Application No. 202110654668.8, filed on Jun. 11, 2021, which are hereby incorporated by reference in their entireties.

TECHNICAL FIELD

This application relates to the field of communication technologies, and in particular, to a communication method and device.

BACKGROUND

Extended reality (XR) refers to an environment that is generated by using a computer technology and a wearable device and that is a combination of reality and virtuality and capable of performing human-computer interaction, and is a general term for a plurality of forms such as augmented reality (AR), virtual reality (VR), and mixed reality (MR). The XR combines visual interaction technologies to implement a seamless "immersive" experience between virtual and real worlds.

An XR service is usually transmitted between a network device and a terminal device in a form of a "frame", where each frame represents a still image, and one frame may be transmitted by using a plurality of internet protocol (IP) packets. Different frames may have different importance. For example, importance of an I frame is higher than that of a P frame. The importance of different frames in a transmission process has to be determined.

SUMMARY

Embodiments of this application provide a communication method and device, to separately control data packets of different importance degrees in a transmission process.

According to a first aspect, a first communication method is provided. The method may be performed by a terminal device, or may be performed by a device including the terminal device, or may be performed by a chip system or another functional module. The chip system or the functional module can implement a function of the terminal device. Alternatively, the method may be performed by a network device, or may be performed by a chip system or another functional module. The chip system or the functional module can implement a function of the network device. For example, the network device is a core network device, for example, a UPF. The method includes: receiving a first traffic flow; and sending the first traffic flow by using at least two QoS flows.

In this embodiment of this application, the first traffic flow corresponding to an application may be transmitted by using the at least two QoS flows. For example, different QoS flows may be used to transmit data packets of different importance degrees. In this way, the data packets of different importance degrees can be separately controlled, for example, sending of a more important data packet is preferentially ensured, to improve transmission reliability of these data packets, and ensure service experience of a user. In addition, only one traffic flow needs to be transmitted between a transmit end and a receive end. For example, the transmit end or the receive end is an application server. In this case, a working mode of the application server is slightly changed, so that the application server can work according to an existing protocol as much as possible, which can be better compatible with the existing protocol, and is more conducive to popularization and commercial use.

With reference to the first aspect, in a first optional implementation of the first aspect, the first traffic flow corresponds to a first data packet. The receiving a first traffic flow includes: receiving the first data packet. The sending the first traffic flow by using at least two QoS flows includes: determining a first rule corresponding to the first data packet, where the first rule is a QoS rule or a data packet detection rule; and mapping the first data packet to a QoS flow that is indicated by the first rule and that matches an importance degree of the first data packet for sending, where the QoS flow is one of the at least two QoS flows. A mapping rule corresponding to the data packet is the first rule, and the first rule may indicate the at least two QoS flows. In other words, the first traffic flow may be transmitted between a receive end and a transmit end of the data packet, and the at least two QoS flows may be mapped for the first traffic flow according to the first rule. For example, data packets of different importance degrees are transmitted by using different QoS flows, so that the data packets of different importance degrees can be separately controlled, for example, sending of the more important data packet is preferentially ensured, to ensure service experience of the user. In addition, only one traffic flow needs to be transmitted between a transmit end and a receive end, for example, the transmit end or the receive end is a server. In this case, a working mode of the server is slightly changed, so that the server can work according to the existing protocol as much as possible.

With reference to the first aspect or the first optional implementation of the first aspect, in a second optional implementation of the first aspect, the at least two QoS flows include a first QoS flow and a second QoS flow. An importance degree of a data packet transmitted by using the first QoS flow is higher than that of a data packet transmitted by using the second QoS flow. The data packets of different importance degrees are transmitted by using different QoS flows, so that the data packets of different importance degrees can be separately controlled. For example, when network quality deteriorates, if a data packet needs to be discarded, a data packet with a low importance degree may be discarded, and normal transmission of a data packet with a high importance degree is ensured as far as possible, to reduce a probability that a receive end cannot normally output a data packet, and improve user experience.

With reference to the second optional implementation of the first aspect, in a third optional implementation of the first aspect, the first rule indicates the first QoS flow and the second QoS flow, and the importance degree of the data packet transmitted by using the first QoS flow is higher than that of the data packet transmitted by using the second QoS flow. For example, if a quantity of first rules is 1, the first rule may indicate the first QoS flow and the second QoS flow, and corresponding rules do not need to be separately created for different QoS flows. This can reduce a quantity of maintained rules, reduce storage space, and simplify a process of matching a data packet with a rule.

With reference to the third optional implementation of the first aspect, in a fourth optional implementation of the first aspect, a first field of the first rule indicates the first QoS flow, and a second field of the first rule indicates the second QoS flow. For example, the first field is an original field in the first rule, and the second field is a newly defined field in the first rule. In other words, the original field indicates a QoS flow of a high importance degree, and the newly added field indicates a QoS flow of a low importance degree. Therefore, an importance degree matching a QoS flow can be determined by using a field in the first rule, to map a data packet to the corresponding QoS flow. Alternatively, the first field may be a newly defined field in the first rule, and the second field is an original field in the first rule. Alternatively, both the first field and the second field are original fields or newly defined fields in the first rule. This is not limited in this embodiment of this application.

With reference to the first optional implementation of the first aspect, in a fifth optional implementation of the first aspect, when the first rule is the QoS rule, the QoS rule includes a first QoS rule and a second QoS rule, where the first QoS rule indicates a first QoS flow in the at least two QoS flows, and the second QoS rule indicates a second QoS flow in the at least two QoS flows. Alternatively, when the first rule is the data packet detection rule, the data packet detection rule includes a first data packet detection rule and a second data packet detection rule, where the first data packet detection rule indicates a first QoS flow in the at least two QoS flows, and the second data packet detection rule indicates a second QoS flow in the at least two QoS flows. For example, if UE uses the first rule, the first rule is, for example, the QoS rule. If a UPF uses the first rule, the first rule is, for example, the data packet detection rule. The first rule may include two rules, which is equivalent to setting corresponding rules for different QoS flows separately. In this case, a format of the rule is slightly changed, so that the format of the rule can be better compatible with the existing protocol.

With reference to the fifth optional implementation of the first aspect, in a sixth optional implementation of the first aspect, when the first rule is the QoS rule, a precedence of the first QoS rule is the same as a precedence of the second QoS rule. Alternatively, when the first rule is the data packet detection rule, a precedence of the first data packet detection rule is the same as a precedence of the second data packet detection rule. When matching an IP 5-tuple of a data packet with rules, the UE or the UPF generally performs sequential matching based on precedences of the rules. For example, if an IP 5-tuple of a data packet can match both the first rule and a second rule, but the data packet has a low importance degree, the data packet should be mapped to the second QoS flow for transmission. However, for example, if the precedence of the first rule is higher than that of the second rule, the UE or the UPF may first determine that the data packet matches the first rule. In this case, it is not determined that the data packet also matches the second rule. In this case, two cases may occur. One case is: Although the importance degree of the data packet does not match an importance degree of a data packet transmitted by using a QoS flow indicated by the first rule, because only the first rule is matched in this case, the UE or the UPF still maps the data packet to the first QoS flow for transmission. This may cause data packet transmission disorder. The other case is: Because the importance degree of the data packet does not match the importance degree of the data packet transmitted by using the QoS flow indicated by the first rule, the UE or the UPF may consider that a transmission error occurs, and may discard the data packet. This may further cause packet loss. In view of this, optionally, in this embodiment of this application, the precedence of the first rule may be the same as the precedence of the second rule. In this way, when matching a data packet with a rule, the UE or the UPF may obtain the first rule and the second rule through matching, so that the data packet can be mapped to an appropriate QoS flow.

According to a second aspect, a second communication method is provided. The method may be performed by a network device, or may be performed by a chip system or another functional module. The chip system or the functional module can implement a function of the network device. For example, the network device is a core network device, for example, an SMF. The method includes: receiving a first request message, where the first request message is used to request to determine correlated QoS flows, and the correlated QoS flows are used to transmit a traffic flow corresponding to an application; and creating a QoS flow based on the first request message, where the created QoS flow and at least one established QoS flow are the correlated QoS flows, or created QoS flows are the correlated QoS flows.

With reference to the second aspect, in a first optional implementation of the second aspect, the first request message further indicates a quantity of created QoS flows.

With reference to the second aspect or the first optional implementation of the second aspect, in a second optional implementation of the second aspect, the first request message further includes description information of the created QoS flow, or the first request message further includes description information of the created QoS flow, and includes an identifier of the at least one QoS flow. If all the correlated QoS flows are QoS flows created this time, the first request message may include description information of the created QoS flows. Alternatively, if the correlated QoS flows further include the at least one established QoS flow in addition to the QoS flow created this time, the first request message may further include the identifier of the at least one QoS flow in addition to the description information of the created QoS flow. In this way, the SMF can determine that a specific QoS flow and the created QoS flow are the correlated QoS flows, and the SMF does not need to select to correlate a specific established QoS flow with the created QoS flow, thereby simplifying work of the SMF.

With reference to the second optional implementation of the second aspect, in a third optional implementation of the second aspect, the description information of the created QoS flow includes one or more of the following: a 5QI of the created QoS flow, a GFBR of the created QoS flow, an MFBR of the created QoS flow, or an averaging window of the created QoS flow.

With reference to any one of the second aspect, or the first optional implementation of the second aspect to the third optional implementation of the second aspect, in a fourth optional implementation of the second aspect, when the quantity of created QoS flows is greater than 1, the method further includes: setting a first rule corresponding to a first QoS flow, and skipping setting a corresponding rule for a second QoS flow. A first field of the first rule indicates the first QoS flow, and a second field of the first QoS rule indicates the second QoS flow. The first QoS flow and the second QoS flow belong to the created QoS flows, an importance degree of a data packet transmitted by using the first QoS flow is higher than that of a data packet transmitted by using the second QoS flow, and the first rule is a QoS rule or a data packet detection rule. If the quantity of created QoS flows is greater than 1, one rule may be set for the created QoS flows, and a corresponding rule does not need to be set for each QoS flow. This can reduce a quantity of set rules, reduce storage space, and simplify a process of matching a data packet with a rule.

With reference to any one of the second aspect, or the first optional implementation of the second aspect to the third optional implementation of the second aspect, in a fifth optional implementation of the second aspect, when the quantity of created QoS flows is 1, the method further includes: setting a first rule corresponding to a first QoS flow, and deleting QoS mapping information corresponding to the application (or the first traffic flow) from a second rule. The first QoS flow is the created QoS flow, the second rule corresponds to a second QoS flow, and the second QoS flow belongs to the at least one QoS flow. An importance degree of a data packet transmitted by using the first QoS flow is higher than that of a data packet transmitted by using the second QoS flow. The first rule is a first QoS rule, and the second rule is a first QoS rule; or the first rule is a first data packet detection rule, and the second rule is a second data packet detection rule. Because the second QoS flow is the established QoS flow, the second QoS flow may have a corresponding rule. For example, the rule is referred to as the second rule. If the second QoS flow is originally used to transmit a first application (or the first traffic flow), the second rule may include mapping information (or referred to as matching information) corresponding to the first application (or the first traffic flow). The mapping information corresponding to the first application (or the first traffic flow) includes, for example, information such as an IP 5-tuple of the first application (or the first traffic flow). However, when the first application (or the first traffic flow) is previously transmitted by using the second rule, the corresponding IP 5-tuple may be different from an IP 5-tuple corresponding to the first application (or the first traffic flow) when the first rule is used for transmission. Therefore, the SMF may delete the mapping information that is included in the second rule and that corresponds to the first application (or the first traffic flow). If there is a data packet corresponding to the first application (or the first traffic flow) subsequently, the UE or the UPF may determine, based on an IP 5-tuple of the data packet, that the data packet corresponds to the first rule, and determine, based on a correlation relationship stored in the SMF, that the data packet further corresponds to the second QoS flow indicated by the second rule. There is no need to perform matching based on the IP 5-tuple included in the second rule, to reduce a matching failure case.

With reference to the fifth optional implementation of the second aspect, in a sixth optional implementation of the second aspect, the method further includes: storing a correlation relationship between the first QoS flow and the second QoS flow, to correlate the first QoS flow with the second QoS flow. Because the second QoS flow is the established QoS flow, the SMF may store the correlation relationship between the first QoS flow and the second QoS flow, to determine that the first QoS flow and the second QoS flow are the correlated QoS flows.

With reference to any one of the second aspect, or the first optional implementation of the second aspect to the third optional implementation of the second aspect, in a seventh optional implementation of the second aspect, when the quantity of created QoS flows is 1, the method further includes: skipping setting a corresponding rule for a second QoS flow, and updating a first rule corresponding to a first QoS flow, where an updated first rule includes a second field, the second field indicates the second QoS flow, the second QoS flow is the created QoS flow, the first QoS flow belongs to the at least one QoS flow, an importance degree of a data packet transmitted by using the first QoS flow is higher than that of a data packet transmitted by using the second QoS flow, and the first rule is a QoS rule or a data packet detection rule. In this case, no rule may be set for the created QoS flow, and the first rule corresponding to the first QoS flow indicates the first QoS flow and the second QoS flow. This can reduce a quantity of set rules, reduce storage space, and simplify a process of matching a data packet with a rule.

With reference to any one of the second aspect, or the first optional implementation of the second aspect to the third optional implementation of the second aspect, in an eighth optional implementation of the second aspect, when the quantity of created QoS flows is greater than 1, the method further includes: setting a first rule corresponding to a first QoS flow and a second rule corresponding to a second QoS flow, where the first rule indicates a first-type service, and the second rule indicates a second-type service. An importance degree of the first-type service is higher than that of the second-type service. The first rule is a first QoS rule, and the second rule is a first QoS rule; or the first rule is a first data packet detection rule, and the second rule is a second data packet detection rule. In this case, a corresponding rule may be set for each QoS flow, so that one rule indicates one QoS flow. In addition, a format of such a rule is closer to a rule defined in an existing protocol, so that this embodiment of this application can be better compatible with the existing protocol.

With reference to any one of the second aspect, or the first optional implementation of the second aspect to the third optional implementation of the second aspect, in a ninth optional implementation of the second aspect, when the quantity of created QoS flows is 1, the method further includes: setting a first rule corresponding to a first QoS flow, and updating a second rule corresponding to a second QoS flow, where the first rule indicates a first-type service, an updated second rule indicates a second-type service, the first QoS flow is the created QoS flow, and the second QoS flow belongs to the at least one QoS flow; or setting a second rule corresponding to a second QoS flow, and updating a first rule corresponding to a first QoS flow, where an updated first rule indicates a first-type service, the second rule indicates a second-type service, the second QoS flow is the created QoS flow, and the first QoS flow belongs to the at least one QoS flow. The first rule is a first QoS rule, and the second rule is a first QoS rule; or the first rule is a first data packet detection rule, and the second rule is a second data packet detection rule; and an importance degree of the first-type service is higher than that of the second-type service. If the quantity of created QoS flows is 1, in addition to setting a rule for the created QoS flow, a rule of the existing QoS flow may be updated, so that a corresponding rule can indicate an importance degree of an indicated QoS flow. In this way, UE or a UPF can map a data packet to an appropriate QoS flow based on an importance degree of the data packet.

For technical effect brought by the second aspect or some optional implementations of the second aspect, refer to the descriptions of technical effect of the first aspect or the corresponding implementations.

According to a third aspect, a third communication method is provided. The method may be performed by a network device, or may be performed by a chip system or another functional module. The chip system or the functional module can implement a function of the network device. For example, the network device is a core network device, for example, an AMF. The method includes: receiving request information from a terminal device, where the request information is used to request establishment of a session that supports correlated QoS flows; and selecting an SMF for the terminal device based on the request information, where the SMF supports the correlated QoS flows.

For technical effect brought by the third aspect or the optional implementations of the third aspect, refer to the descriptions of the technical effect of the first aspect or the corresponding implementations, and/or refer to the descriptions of the technical effect of the second aspect or the corresponding implementations.

According to a fourth aspect, a communication apparatus is provided. The communication apparatus may be the terminal device according to any one of the first aspect to the third aspect. The communication apparatus has a function of the foregoing terminal device. The communication apparatus is, for example, the terminal device, or a functional module in the terminal device, for example, a baseband apparatus or a chip system. Alternatively, the communication apparatus may be the network device according to any one of the first aspect to the third aspect. The communication apparatus has a function of the foregoing network device. The communication apparatus is, for example, the network device, or a functional module in the network device, for example, a baseband apparatus or a chip system. The network device is, for example, a UPF, an SMF, or an AMF. In an optional implementation, the communication apparatus includes the baseband apparatus and a radio frequency apparatus. In another optional implementation, the communication apparatus includes a processing unit (sometimes also referred to as a processing module) and a transceiver unit (sometimes also referred to as a transceiver module). The transceiver unit can implement a sending function and a receiving function. When the transceiver unit implements the sending function, the transceiver unit may be referred to as a sending unit (sometimes also referred to as a sending module). When the transceiver unit implements the receiving function, the transceiver unit may be referred to as a receiving unit (sometimes also referred to as a receiving module). The sending unit and the receiving unit may be a same functional module. The functional module is referred to as the transceiver unit. The functional module can implement the sending function and the receiving function. Alternatively, the sending unit and the receiving unit may be different functional modules, and the transceiver unit is a collective name for these functional modules.

For example, the transceiver unit (or the receiving unit) is configured to receive a first traffic flow, and the transceiver unit (or the sending unit) is configured to send the first traffic flow by using at least two QoS flows.

For another example, the transceiver unit (or the receiving unit) is configured to receive a first traffic flow, and the transceiver unit (or the sending unit) is configured to send the first traffic flow by using at least two QoS flows.

For another example, the transceiver unit (or the receiving unit) is configured to receive a first request message, where the first request message is used to request to determine correlated QoS flows, and the correlated QoS flows are used to transmit a traffic flow corresponding to an application. The processing unit is configured to create a QoS flow based on the first request message, where the created QoS flow and at least one established QoS flow are the correlated QoS flows, or created QoS flows are the correlated QoS flows.

For still another example, the transceiver unit (or the receiving unit) is configured to receive request information from a terminal device, where the request information is used to request to establish a session that supports correlated QoS flows. The processing unit is configured to select an SMF for the terminal device based on the request information, where the SMF supports the correlated QoS flows.

In an optional implementation, the communication apparatus further includes a storage unit; and the processing unit is configured to: couple to the storage unit, and execute programs or instructions in the storage unit, to enable the communication apparatus to perform a function of the terminal device or the network device according to any one of the first aspect to the third aspect.

According to a fifth aspect, a communication system is provided. The communication system includes, for example, a mobility management function network element, a session management function network element, and a first network element. The mobility management function network element is, for example, an AMF, the session management function network element is, for example, an SMF, and the first network element is, for example, UE or a UPF. The mobility management function network element is configured to: receive request information from a terminal device, where the request information is used to request to establish a session that supports correlated QoS flows; and select a session management function network element for the terminal device based on the request information, where the session management function network element supports the correlated QoS flows. The session management function network element is configured to: receive a first request message, where the first request message is used to request to determine correlated QoS flows, and the correlated QoS flows are used to transmit a traffic flow corresponding to an application; and create a QoS flow based on the first request message, where the created QoS flow and at least one established QoS flow are the correlated QoS flows, or created QoS flows are the correlated QoS flows. The first network element is configured to receive a first traffic flow, and send the first traffic flow by using at least two QoS flows, where the at least two QoS flows are the correlated QoS flows. For technical effect of the fifth aspect, refer to descriptions of technical effect of one or more of the first aspect to the third aspect.

According to a sixth aspect, an apparatus is provided, including units configured to perform the method described in any embodiment of this application.

According to a seventh aspect, a computer-readable storage medium is provided. The computer-readable storage medium is configured to store computer programs or instructions. When the computer programs or instructions are run, the method performed by the terminal device or the network device in the foregoing aspects is implemented.

According to an eighth aspect, a computer program product including instructions is provided. When the computer program product runs on a computer, the method in the foregoing aspects is implemented.

BRIEF DESCRIPTION OF THE DRAWINGS

FIG. 4B is a schematic diagram of a QoS rule according to an embodiment of this application;

FIG. 4C is a schematic diagram of another QoS rule according to an embodiment of this application;

DETAILED DESCRIPTION OF ILLUSTRATIVE EMBODIMENTS

Figures 1, 2:
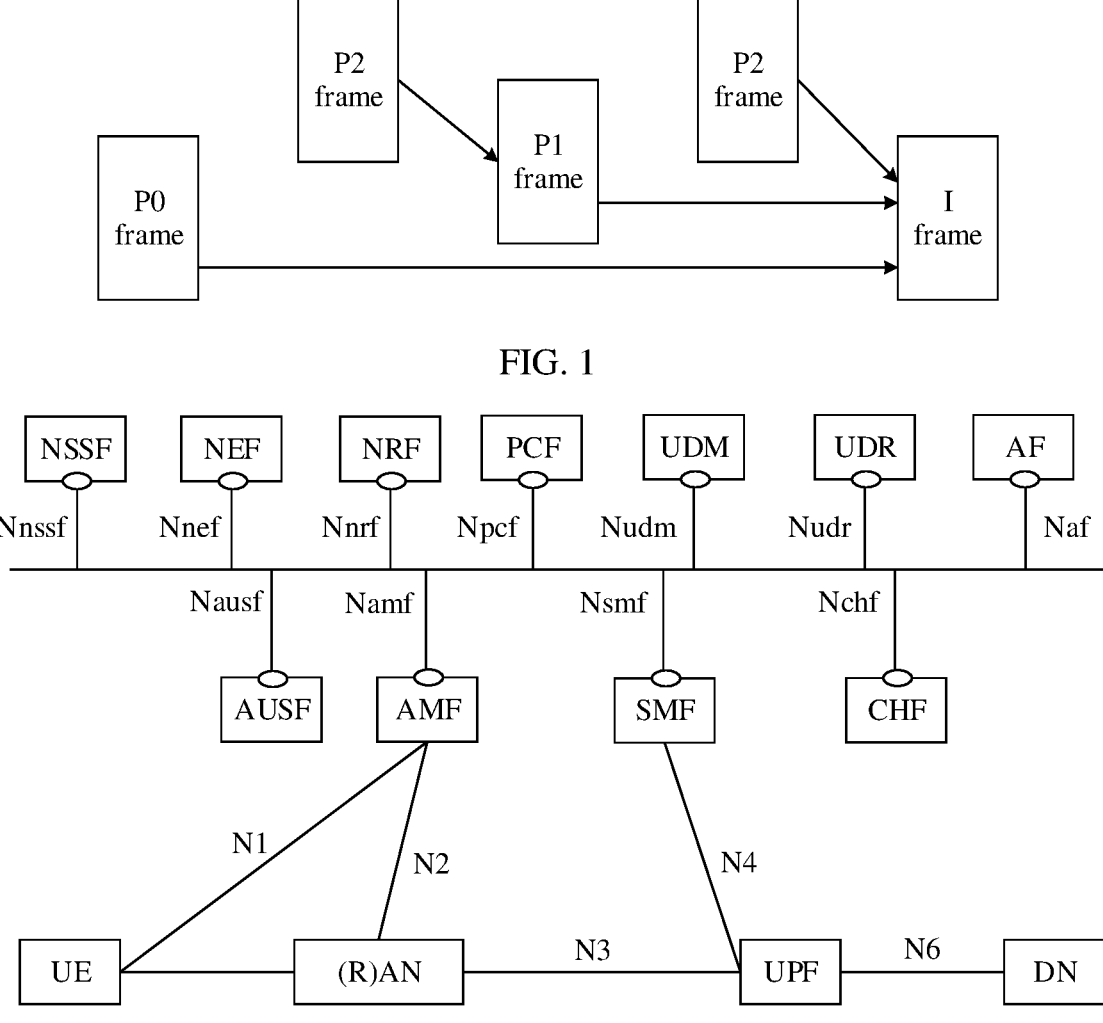
FIG. 1 is a schematic diagram of a relationship between a P frame and an I frame.
FIG. 2 is a schematic diagram of an application scenario according to an embodiment of this application.

To make the various embodiments and advantages of embodiments of this application clearer, the following further describes embodiments of this application in detail with reference to accompanying drawings.

The following explains and describes some terms or concepts in embodiments of this application, to facilitate understanding by a person skilled in the art.

In embodiments of this application, a terminal device is a device with a wireless transceiver function, and may be a fixed device, a mobile device, a handheld device (for example, a mobile phone), a wearable device, a vehicle-mounted device, or a wireless apparatus (for example, a communication module, a modem, or a system on a chip) built in the foregoing device. The terminal device is configured to connect people, things, machines, and the like, and may be widely used in various scenarios, for example, including but not limited to the following scenarios: cellular communication, device-to-device (D2D) communication, vehicle-to-everything (V2X), machine-to-machine/machine-type communication (M2M/MTC), internet of things (IoT), virtual reality (VR), augmented reality (AR), industrial control, self-driving, remote medical, smart grid smart furniture, smart office, smart wearables, smart transportation, smart city, uncrewed aerial vehicles, and robots. The terminal device may sometimes be referred to as user equipment (UE), a terminal, an access station, a UE station, a remote station, a wireless communication device, a user apparatus, or the like. For ease of description, an example in which the terminal device is the UE is used for description in embodiments of this application.

A network device in embodiments of this application includes, for example, an access network device and/or a core network device. The access network device is a device with a wireless transceiver function, and is configured to communicate with the terminal device. The access network device includes but is not limited to: a base station (BTS, NodeB, eNodeB/eNB, or gNodeB/gNB) in a communication system, a transmission reception point (TRP), a base station subsequently evolved in the 3rd generation partnership project (3GPP), an access node in a wireless fidelity (Wi-Fi) system, a wireless relay node, a wireless backhaul node, and the like. The base station may be a macro base station, a micro base station, a picocell base station, a small cell, a relay station, or the like. A plurality of base stations may support the foregoing networks using a same access technology, or may support the foregoing networks using different access technologies. The base station may include one or more co-site or non-co-site transmission reception points. The network device may alternatively be a radio controller, a central unit (CU), and/or a distributed unit (DU) in a cloud radio access network (CRAN) scenario. Alternatively, the network device may be a server, a wearable device, or the like. For example, a network device in a vehicle-to-everything (V2X) technology may be a road side unit (RSU). The following provides descriptions by using an example in which the access network device is the base station. The base station may communicate with a terminal device, or may communicate with a terminal device via a relay station. The terminal device may communicate with a plurality of base stations in different access technologies. The core network device is configured to implement functions such as mobility management, data processing, session management, and policy and charging. Names of devices that implement core network functions in systems using different access technologies may be different. This is not limited in embodiments of this application. A 5G system is used as an example. The core network device includes an access and mobility management function (AMF), a session management function (SMF), a policy control function (PCF), a user plane function (UPF), or the like.

In embodiments of this application, a communication apparatus configured to implement a function of the network device may be a network device, or may be an apparatus that can support the network device in implementing the function, for example, a chip system. The apparatus may be installed in the network device. In the technical solutions provided in embodiments of this application, an example in which the apparatus configured to implement the function of the network device is the network device is used to describe the technical solutions provided in embodiments of this application.

XR refers to an environment that is generated by using a computer technology and a wearable device and that is a combination of reality and virtuality and capable of performing human-computer interaction, and is a general term for a plurality of forms such as AR, VR, and MR. The XR combines visual interaction technologies to implement a seamless "immersive" experience between virtual and real worlds. An XR service is usually transmitted between a network device and a terminal device in a form of a "frame", where each frame represents a still image. In actual compression, various algorithms are used to reduce a data capacity. For example, an I frame indicates a key frame, which may be understood as follows: The frame indicates a complete picture. During decoding, only data of this frame is required (because the complete picture is included). A P frame indicates a difference between this frame and a previous key frame (for example, the I frame). During decoding, a buffered picture needs to be superimposed with the difference defined in this frame to generate a final picture. In an actual transmission process, a size of each frame is related to a size and quality (for example, 1080p or 720p) of a picture. Generally, each frame needs to be transmitted by using a plurality of internet protocol (IP) packets. For example, the I frame needs to be transmitted by using 100 IP packets, and the P frame is transmitted by using 40 IP packets.

Relatively speaking, importance of the I frame is higher than that of the P frame, because when a part of the P frame fails to be transmitted, only display of the P frame is affected, and user experience is temporary frame freezing. However, if the I frame fails to be transmitted, subsequent P frames cannot be parsed, and user experience is long frame freezing. FIG. 1 is used as an example. P0 is a P frame obtained by making large modification on an I frame, P1 is a frame obtained by making small modification on the I frame or the P0 frame, and P2 is a P frame obtained by making small modification on a previous frame (the I frame, the P0 frame, or the P1 frame). If the P1 or P2 frame is lost, only display of a current frame is affected, which causes less impact. If the I or P0 frame is lost, display of subsequent several frames is affected, which causes great impact.

In embodiments of this application, unless otherwise specified, a quantity of nouns represents "singular nouns or plural nouns", that is, "one or more". "At least one" refers to one or more, and "a plurality of" refers to two or more. The term "and/or" describes a correlation relationship for describing correlated objects and represents that three relationships may exist. For example, A and/or B may represent the following three cases: Only A exists, both A and B exist, and only B exists. A and B each may be singular or plural. The character "/" generally indicates an "or" relationship between the correlated objects. For example, A/B indicates A or B. "At least one item (piece) of the following" or a similar expression thereof means any combination of these items, including a singular item (piece) or any combination of plural items (pieces). For example, at least one (piece) of a, b, or c may represent: a, b, c, a-b, a-c, b-c, or a-b-c, where a, b, and c may be singular or plural.

Ordinal numerals such as "first" and "second" in embodiments of this application are used to distinguish between a plurality of objects, and are not intended to limit sizes, content, a sequence, a time sequence, precedences, or importance degrees of the plurality of objects. For example, a first QoS flow and a second QoS flow may be a same QoS flow, or may be different QoS flows. In addition, these names do not indicate that the two QoS flows correspond to different traffic flows, precedences, or importance degrees. In addition, numbers of steps in the embodiments described in this application are merely used to distinguish different steps, but are not used to limit a sequence of the steps. For example, step S301 may occur before step S302, or may occur after step S302, or may occur simultaneously with step S302.

The following uses the 5G system as an example to describe a network architecture that may be applied to the 5G system in which the solutions in embodiments of this application are located, or an application scenario of embodiments of this application in the 5G system. The architecture of the 5G communication system is divided into two parts: an access network and a core network. The access network is used to implement functions related to radio access, and the access network includes a 3rd generation partnership project (3rd generation partnership project, 3GPP) access network and a non-(non)-3GPP access network. The core network is connected to the access network, and is used to implement functions related to user control and management.

FIG. 2 is a schematic diagram of a network architecture to which an embodiment of this application is applied. The network architecture is, for example, a service-oriented architecture of a 5G network. The 5G network includes a (radio) access network ((R)AN) device, a UPF, an AMF, an SMF, an authentication server function (AUSF), a network slice selection function (NSSF), a network exposure function (NEF), a network repository function (NRF), a policy control function (PCF), a unified data management (UDM), a unified data repository (UDR), an application function (AF), a charging function (CHF), or the like. It should be noted that FIG. 2 merely provides some examples of network elements or entities in the 5G network. The 5G network may further include some network elements or entities that are not shown in FIG. 2, such as a network data analytics function (NWDAF). This is not specifically limited in this embodiment of this application.

As shown in FIG. 2, a terminal device accesses the 5G network through the (R)AN device, and the terminal device communicates with the AMF through an N1 interface (N1 for short). The (R)AN device communicates with the AMF through an N2 interface (N2 for short). The (R)AN device communicates with the UPF through an N3 interface (N3 for short). The SMF communicates with the UPF through an N4 interface (N4 for short), and the UPF accesses a DN through an N6 interface (N6 for short). In addition, control plane functions such as the AUSF, the AMF, the SMF, the NSSF, the NEF, the NRF, the PCF, the UDM, the UDR, the CHF, or the AF shown in FIG. 2 interact with each other through a service-oriented interface. For example, a service-oriented interface provided by the AUSF for another network element is Nausf, a service-oriented interface provided by the AMF for an external system is Namf, a service-oriented interface provided by the SMF for another network element is Nsmf, a service-oriented interface provided by the NSSF for another network element is Nnssf, a service-oriented interface provided by the NEF for another network element is Nnef, a service-oriented interface provided by the NRF for another network element is Nnrf, a service-oriented interface provided by the PCF for another network element is Npcf, a service-oriented interface provided by the UDM for another network element is Nudm, a service-oriented interface provided by the UDR for another network element is Nudr, a service-oriented interface provided by the CHF for another network element is Nchf, and a service-oriented interface provided by the AF for another network element is Naf. For related function descriptions and interface descriptions, refer to a diagram of a 5G system architecture (5G system architecture) in the 23501 standard. Details are not described herein.

The following describes methods provided in embodiments of this application with reference to the accompanying drawings. In the accompanying drawings corresponding to embodiments of this application, all optional steps are represented by dotted lines. For ease of description, an example in which embodiments of this application is applied to the 5G system is used, for example, applied to the network architecture shown in FIG. 2. In each of the following embodiments, an example in which the mobility management function network element is an AMF network element, the session management function network element is an SMF network element, the policy control function network element is a PCF network element, and the user plane function network element is a UPF network element is used for description. Further, the AMF network element is referred to as an AMF for short, the SMF network element is referred to as an SMF for short, the PCF network element is referred to as a PCF for short, and the UPF network element is referred to as a UPF for short. In other words, as described in embodiments of this application, the AMF may be replaced with the mobility management function network element, the PCF may be replaced with the policy control function network element, the SMF may be replaced with the session management function network element, and the UPF may be replaced with the user plane function network element. The methods provided in embodiments of this application may alternatively be applied to a communication system other than the 5G system. This is not limited. In addition, a server described in embodiments of this application is, for example, an application server that can provide an application required by the UE, for example, an XR server. Alternatively, the server may be an intermediate server connected between a core network device and an application server, for example, a content delivery network (CDN) server or a multimedia resource function processor (MRFP).

Figure 3:
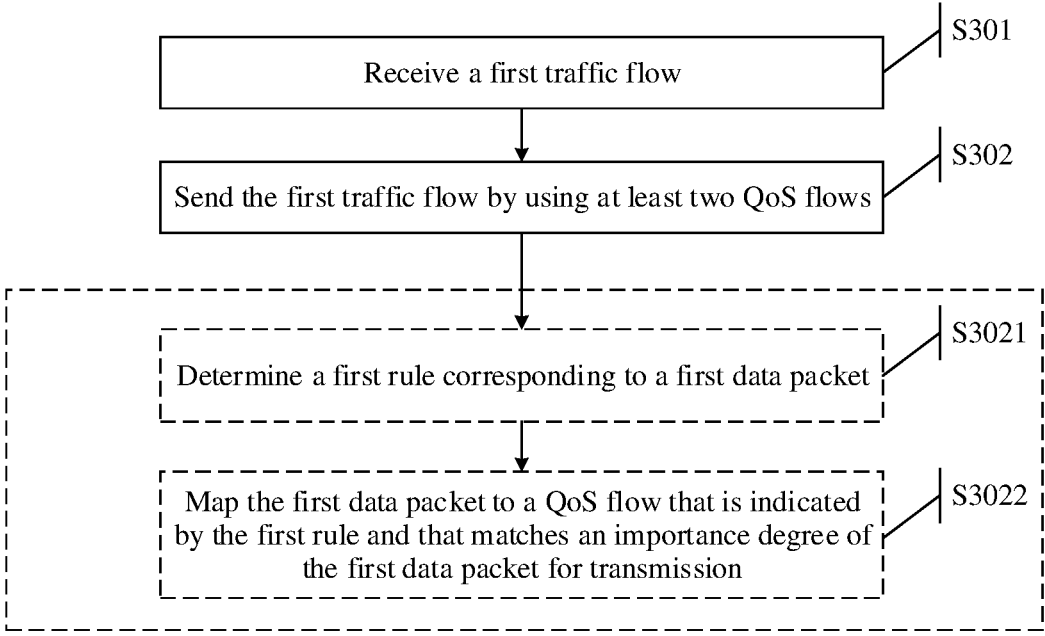
FIG. 3 is a flowchart of a first communication method according to an embodiment of this application.

An embodiment of this application provides a communication method. FIG. 3 is a flowchart of the method.

S301: Receive (or obtain) a first traffic flow. The first traffic flow is a traffic flow of a first application, and a quantity of first traffic flows is, for example, 1, in other words, the first traffic flow is one traffic flow. The first application may correspond to one or more traffic flows, and the first traffic flow is one of the traffic flows. For example, the first application is a video application. After invoking the video application on UE, a user may further open a movie in the video application. In this case, a traffic flow corresponding to the movie is, for example, the first traffic flow. In this case, the first application corresponds to a plurality of traffic flows, and the first traffic flow is one of the plurality of traffic flows.

For example, receiving the first traffic flow may be reflected by receiving one or more data packets corresponding to the first traffic flow. In the following descriptions, receiving a first data packet is used as an example, and the first data packet is a data packet corresponding to the first traffic flow.

If the first data packet is a downlink data packet, S301 may be performed by a UPF. For example, when a server sends the first traffic flow, the UPF receives the first traffic flow from the server, which is considered that the UPF obtains the first traffic flow.

Alternatively, if the first data packet is an uplink data packet, S301 may be performed by the UE. For example, an application layer of the UE (for example, an application processor (AP) of the UE or an application (APP) installed in the UE for providing the first application) sends the first traffic flow to a modem of the UE. When the modem of the UE receives the first traffic flow from the application layer of the UE, it is considered that the UE receives (or obtains) the first traffic flow.

In this embodiment of this application, for the first application, one traffic flow may be transmitted between the UE and the server. For example, a connection is established between the UE and the server to transmit the traffic flow. The connection is a transport layer connection, for example, a transmission control protocol (tTCP) connection, a user datagram protocol (UDP) connection, a quick UDP internet connection (QUIC), or a secure reliable transport (SRT) connection. In a description process of embodiments of this application, that the connection is the TCP connection is used as an example. For example, the first data packet is a data packet of the first application, namely, a data packet corresponding to the first traffic flow. For downlink transmission, the server may send the first data packet by using the first traffic flow and through the TCP connection. For uplink transmission, the server may receive the first data packet by using the first traffic flow and through the TCP connection.

S302: Send the first traffic flow by using at least two QoS flows.

Although the data packet of the first application corresponds to one traffic flow (the first traffic flow), in this embodiment of this application, the first traffic flow may be transmitted by using the at least two QoS flows. For example, different QoS flows may be used to transmit data packets of different importance degrees. In this way, the traffic flows can be controlled, for example, sending of a more important data packet is preferentially ensured, to improve transmission reliability of these data packets, and ensure service experience of the user. In addition, only one traffic flow needs to be transmitted between a transmit end and a receive end. For example, the transmit end or the receive end is an application server. In this case, a working mode of the application server is slightly changed, so that the application server can work according to an existing protocol as much as possible, and can be better compatible with the existing protocol.

A manner of sending the first data packet by using the at least two QoS flows is described by using the first data packet of the first traffic flow as an example. For example, sending the first data packet by using the at least two QoS flows may be implemented by using S3021 and S3022.

S3021: Determine a first rule corresponding to the first data packet. The first rule may indicate a QoS flow corresponding to the first data packet, or the first rule may be used to determine a specific QoS flow to which the first data packet is mapped.

Figure 4A:
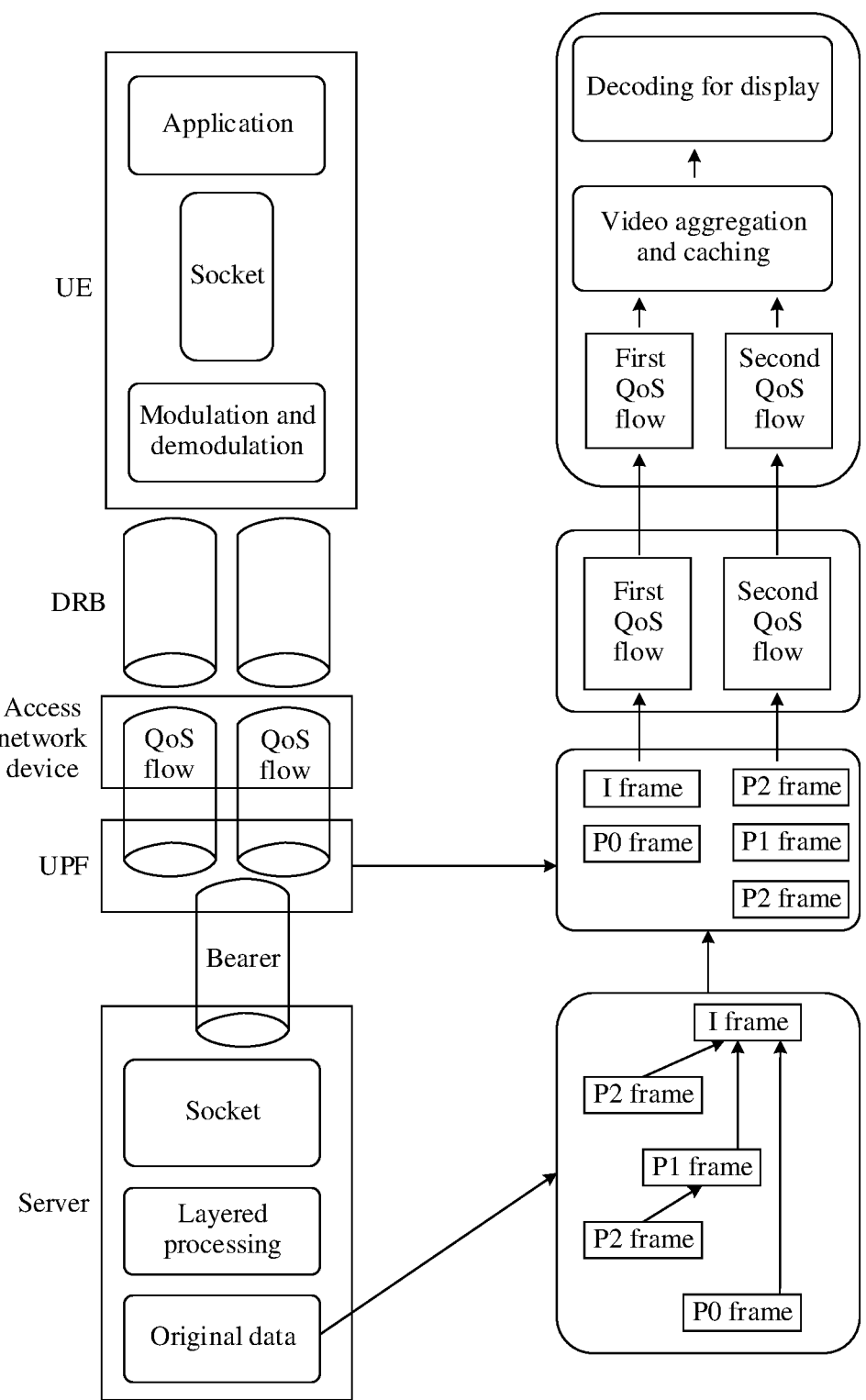
FIG. 4A is a schematic diagram of a transmission mode according to an embodiment of this application.

In this embodiment of this application, although only one traffic flow (the first traffic flow) is transmitted between the UE and the server, the data packet of the first traffic flow may be transmitted between the UPF and the UE by using correlated QoS flows. FIG. 4A is a schematic diagram of a transmission mode according to an embodiment of this application. In FIG. 4A, only one TCP connection is established between the server and the UE. Therefore, there is only one bearer between the server and the UPF, and the data packet (or the first traffic flow) of the first application is transmitted by using the bearer. However, there are two QoS flows between the UPF and the UE. The two QoS flows are, for example, correlated QoS flows, and the correlated QoS flows are used to transmit data packets of one traffic flow. In this manner, the server still needs to transmit only one traffic flow, and the working mode of the server is slightly changed. However, a plurality of QoS flows may be used to transmit the data packet of the traffic flow between the UPF and the UE, and the importance degrees of the data packets transmitted by using different QoS flows may be different. For example, in FIG. 4A, a more important data packet is transmitted by using a first QoS flow, for example, a data packet corresponding to an I frame and/or a P0 frame, and a less important data packet is transmitted by using a second QoS flow, for example, a data packet corresponding to a P1 frame and/or a P2 frame. In this manner, the data packets may be separately controlled based on the importance degrees of the data packets. For example, when network congestion occurs or resources of an access network device are insufficient, a data packet transmitted by using a QoS flow used to transmit a less important data packet may be discarded, and a data packet transmitted by using a QoS flow used to transmit a more important data packet may not be discarded as far as possible. In this way, a packet loss rate of the more important data packet is reduced, to reduce impact of random packet loss on output of a receive end, and improve user experience. The so-called correlated QoS flows may also be referred to as first-type QoS flows, or may have another name. The name does not constitute a limitation on the feature of the correlated QoS flows. In this embodiment of this application, a name such as the "correlated QoS flows" is used as an example for description. The correlated QoS flows may be understood as QoS flows used to transmit data packets of a same application, or QoS flows used to transmit data packets of a same traffic flow. For example, the first traffic flow is transmitted by using the first QoS flow and the second QoS flow, and the two QoS flows are correlated QoS flows.

For example, the first rule may indicate the first QoS flow and the second QoS flow. For example, a first field of the first rule indicates the first QoS flow, and a second field of the first rule indicates the second QoS flow. An importance degree of a data packet transmitted by using the first QoS flow is higher than that of a data packet transmitted by using the second QoS flow. For example, the data packet transmitted by using the first QoS flow corresponds to the I frame or the P0 frame, and the data packet transmitted by using the second QoS flow corresponds to the P1 frame or the P2 frame. The first QoS flow and the second QoS flow that are used to transmit the first traffic flow may be indicated by using the first rule, and it may be determined, according to the first rule, that the first data packet is mapped to the first QoS flow or the second QoS flow. The first rule may have different implementations based on different transmission directions of the first data packet. The following uses examples for description.

1. If the first data packet is the downlink data packet, S3021 may be performed by the UPF. In this case, the first rule is, for example, a data packet detection rule.

The UPF may obtain the data packet detection rule in advance. For example, an implementation of the data packet detection rule is a packet detection rule (packet detection rule, PDR). For example, the data packet detection rule may be generated by an SMF or another network element. For example, the SMF generates the data packet detection rule. After generating the data packet detection rule, the SMF may send the data packet detection rule to the UPF, and the UPF obtains the data packet detection rule.

An example in which the data packet detection rule is the PDR is used. The PDR may include one or more of the following fields: a PDR identifier (a PDR ID), a precedence, packet detection information (PDI), a forwarding action rule (FAQ) ID, a usage reporting rule (URR) ID, or a QoS enforcement rule (QER) ID.

The PDI may be used to determine whether the data packet detection rule is applicable to the data packet. For example, the PDI includes one or more of information such as source interface (source interface) information, local F-TEID (full qualified tunnel endpoint (ID)), a UE IP address, or a packet filter. A packet header of the data packet may include an IP 5-tuple. The UPF compares the IP 5-tuple of the data packet with information included in the PDI of the data packet detection rule. If the IP 5-tuple of the data packet is consistent with the information included in the PDI of the data packet detection rule, the data packet detection rule is applicable to the data packet. Otherwise, the data packet detection rule is not applicable to the data packet. An IP 5-tuple of a data packet includes, for example, a source IP address, a source port number, a destination IP address, a destination port number, and a used protocol (user datagram protocol (UDP) or TCP) of the data packet. For example, if the first data packet is the downlink data packet, a source IP address included in an IP 5-tuple of the first data packet is an IP address of the server, a source port number is a port number of the server, a destination IP address is a UE IP address, and a destination port number is a port number of the UE. For another example, if the first data packet is an uplink data packet, a source IP address included in an IP 5-tuple of the first data packet is a UE IP address, a source port number is a port number of the UE, a destination IP address is an IP address of the server, and a destination port number is a port number of the server.

An FAR may include an application action (application action) to specify an action applicable to the data packet, and a forwarding parameter (forwarding parameter) included in the FAR may specify instructions used for user plane forwarding.

A URR may indicate a charging mode (traffic, duration, or the like) used for measuring a network resource.

A QER may include an identifier of a QoS flow, for example, a QoS flow identifier (QFI). In other words, the data packet that can be applied to the data packet detection rule is mapped by the UPF to the QoS flow corresponding to the QoS flow identifier included in the QER for transmission. For example, in addition to the QFI, the QER may further include one or more of information such as a precedence, a maximum bit rate, or a guaranteed bit rate.

In this embodiment of this application, there may be a plurality of implementations of the data packet detection rule. The following uses examples for description.

In an optional implementation of the data packet detection rule, when a quantity of data packet detection rules is 1, the data packet detection rule may indicate the first QoS flow and the second QoS flow. The first QoS flow and the second QoS flow are, for example, the correlated QoS flows. For example, the first traffic flow is transmitted by using the first QoS flow and the second QoS flow. Certainly, if the correlated QoS flows include another QoS flow in addition to the first QoS flow and the second QoS flow (for example, if the first traffic flow is transmitted by using the another QoS flow in addition to the first QoS flow and the second QoS flow, the correlated QoS flows further include the another QoS flow in addition to the first QoS flow and the second QoS flow), the another QoS flow may also be indicated by using the data packet detection rule, and indication manners are similar. For example, the data packet detection rule is the PDR. Originally, the QER included in the PDR includes only one QFI. Now, the QER needs to include a plurality of QFIs. One manner is to define a new bit or field in the QER. The other QFIs are carried by using the newly defined bit or field. Alternatively, in another manner, a new bit or field is defined in the PDR, where the newly defined bit or field is different from the QER, and the other QFIs are carried by using the newly defined bit or field. For example, a first field of the PDR indicates the first QoS flow, and a second field of the PDR indicates the second QoS flow. The first field is, for example, an original field, and the second field is, for example, a newly defined field (or bit). Alternatively, the second field is, for example, an original field, and the first field is, for example, a newly defined field (or bit).

Optionally, if a QFI is carried by using the newly defined bit or field, it may implicitly indicate that an importance degree of a data packet transmitted by using a QoS flow corresponding to the QFI is low. If a QFI is carried by using the original field, it implicitly indicates that an importance degree of a data packet transmitted by using a QoS flow corresponding to the QFI is high. In this manner, the UPF can map, based on an importance degree of a data packet, the data packet to a QoS flow that matches the importance degree. Alternatively, the data packet detection rule may further include a first importance degree indication, where the first importance degree indication may indicate that the importance degree of the data packet transmitted by using the first QoS flow is higher than that of the data packet transmitted by using the second QoS flow. Alternatively, the first importance degree indication may indicate that the importance degree of the data packet transmitted by using the first QoS flow is high, and the importance degree of the data packet transmitted by using the second QoS flow is low. Alternatively, the first importance degree indication may indicate that the data packet transmitted by using the first QoS flow corresponds to the I frame and/or the P0 frame, and indicate that the data packet transmitted by using the first QoS flow corresponds to the P1 frame and/or the P2 frame. Alternatively, the first importance degree indication may further have another indication manner. The UPF can also map, by using the first importance degree indication based on the importance degree of the data packet, the data packet to the QoS flow that matches the importance degree. In addition, if the data packet detection rule includes the first importance degree indication, an importance degree of a data packet transmitted by using a QoS flow corresponding to a QFI carried by the newly defined bit or field is low, and an importance degree of a data packet transmitted by using a QoS flow corresponding to a QFI carried by the original field is high. Alternatively, an importance degree of a data packet transmitted by using a QoS flow corresponding to a QFI carried by using the newly defined bit or field is high, and an importance degree of a data packet transmitted by using a QoS flow corresponding to a QFI carried by using the original field is low.

For example, importance degrees of the data packets corresponding to the first traffic flow may be different. An XR application is used as an example. Some or all data packets of the XR application are transmitted by using, for example, the first traffic flow, and the first traffic flow is used to transmit both data packets of high importance degrees (for example, data packets/the data packet corresponding to the I frame and/or the P0 frame) and data packets of low importance degrees (for example, data packets/the data packet corresponding to the P1 frame and/or the P2 frame). In this case, the UPF may transmit the data packet of the high importance degree by using the first QoS flow, and transmit the data packet of the low importance degree by using the second QoS flow. If the first QoS flow and the second QoS flow are used to transmit data packets of a same traffic flow, it may be considered that the first QoS flow and the second QoS flow are the correlated QoS flows. Correspondingly, the data packet detection rule may indicate the first QoS flow and the second QoS flow. For example, the data packet detection rule is the PDR, and the QER included in the PDR includes a QFI of the first QoS flow and includes a QFI of the second QoS flow. In this way, after receiving a data packet, the UPF may determine, based on an IP 5-tuple of the data packet, whether the data packet detection rule is applicable to the data packet. If the data packet is applicable, the UPF may map the data packet to the first QoS flow or the second QoS flow for transmission.

In other words, the data packet detection rule is improved in this manner. One data packet detection rule originally indicates one QoS flow. However, in this embodiment of this application, because there are correlated QoS flows, and the correlated QoS flows are used to transmit data packets of a same traffic flow, the data packet detection rule may indicate the correlated QoS flows. The correlated QoS flows include, for example, the at least two QoS flows. The data packets of the same traffic flow may carry a same IP 5-tuple. Therefore, a same data packet detection rule may be applied to these data packets. In this way, there is no need to set a plurality of data packet detection rules for the data packets of the same traffic flow. This can simplify a process of setting the data packet detection rules, and reduce an amount of information maintained by the UPF.

In another optional implementation of the data packet detection rule, the data packet detection rule may include a first data packet detection rule and a second data packet detection rule. The first data packet detection rule indicates the first QoS flow in the correlated QoS flows, and the second data packet detection rule indicates the second QoS flow in the correlated QoS flows. This is an example in which the correlated QoS flows include the first QoS flow and the second QoS flow. Optionally, in addition to indicating the first QoS flow, the first data packet detection rule may further indicate the importance degree of the data packet transmitted by using the first QoS flow, or indicate a frame type corresponding to the data packet transmitted by using the first QoS flow (in other words, indicate a service corresponding to the data packet transmitted by using the first QoS flow), for example, indicate a first-type service, where the first-type service has a high importance degree. An example in which the first application is the XR application is used. For example, the first data packet detection rule indicates that the importance degree of the data packet transmitted by using the first QoS flow is high, or the first data packet detection rule may indicate the I frame and/or the P0 frame (indicating the I frame and/or the P0 frame may be considered as indicating a frame type, or may be considered as indicating the first-type service). An implementation of the second data packet detection rule is also similar. Optionally, in addition to indicating the second QoS flow, the second data packet detection rule may further indicate the importance degree of the data packet transmitted by using the second QoS flow, or indicate a frame type corresponding to the data packet transmitted by using the second QoS flow (in other words, indicate a service corresponding to the data packet transmitted by using the second QoS flow), for example, indicate a second-type service, where the second-type service has a low importance degree. An example in which the first application is the XR application is used. For example, the second data packet detection rule indicates that the importance degree of the data packet transmitted by using the second QoS flow is low, or the second data packet detection rule may indicate the P1 frame and/or the P2 frame (indicating the P1 frame and/or the P2 frame may be considered as indicating a frame type, or may be considered as indicating the second-type service).

In addition to different indicated QoS flows (if importance degrees of traffic flows are indicated, the importance degrees of the indicated traffic flows are different), other parameters included in the first data packet detection rule and the second data packet detection rule may be the same (for example, included parameters such as PDI may be the same), or may be different. This is not limited in this embodiment of this application.

For example, the importance degrees of the data packets corresponding to the first traffic flow may be different. The XR application is used as an example. Some or all of the data packets of the XR application are transmitted by using, for example, the first traffic flow, and the first traffic flow is used to transmit both the data packets of the high importance degrees (for example, the data packets/the data packet corresponding to the I frame and/or the P0 frame) and the data packets of the low importance degrees (for example, the data packets/the data packet corresponding to the P1 frame and/or the P2 frame). In this case, the UPF may transmit the data packet of the high importance degree by using the first QoS flow, and transmit the data packet of the low importance degree by using the second QoS flow. The first QoS flow and the second QoS flow are the correlated QoS flows. Correspondingly, the data packet detection rule may include the first data packet detection rule and the second data packet detection rule. The first data packet detection rule indicates the first QoS flow. For example, the first data packet detection rule is a first PDR, and a QER included in the first PDR includes the QFI of the first QoS flow. The second data packet detection rule indicates the second QoS flow. For example, the second data packet detection rule is a second PDR, and a QER included in the second PDR includes the QFI of the second QoS flow. In this way, after receiving a data packet, the UPF may determine, based on an IP 5-tuple of the data packet, a data packet detection rule applicable to the data packet. For example, both the first data packet detection rule and the second data packet detection rule are applicable to the data packet. The UPF may further determine, from the first data packet detection rule and the second data packet detection rule, a data packet detection rule applicable to the data packet (for example, determine the data packet detection rule applicable to the data packet based on an importance degree of the data packet), and map the data packet to a QoS flow indicated by the data packet detection rule. The QoS flow indicated by the data packet detection rule is the first QoS flow or the second QoS flow.

In addition, when matching an IP 5-tuple of a data packet with data packet detection rules, the UPF generally performs sequential matching based on precedences of the data packet detection rules. For example, an IP 5-tuple of a data packet can match both the first data packet detection rule and the second data packet detection rule, but the data packet has a low importance degree, the data packet should be mapped to the second QoS flow for transmission. However, for example, if a precedence of the first data packet detection rule is higher than that of the second data packet detection rule, the UPF may first determine that the data packet matches the first data packet detection rule. In this case, two cases may occur. One case is: Although the importance degree of the data packet does not match an importance degree of a data packet transmitted by using a QoS flow indicated by the first data packet detection rule, because only the first data packet detection rule is matched in this case, the UPF still maps the data packet to the first QoS flow for transmission. This may cause data packet transmission disorder. The other case is: Because the importance degree of the data packet does not match the importance degree of the data packet transmitted by using the QoS flow indicated by the first data packet detection rule, the UPF may consider that a transmission error occurs, and may discard the data packet. This may further cause packet loss. In view of this, optionally, in this embodiment of this application, if this implementation is used for the data packet detection rule, the precedence of the first data packet detection rule may be the same as the precedence of the second data packet detection rule. In this way, when matching a data packet with a data packet detection rule, the UPF may obtain both the first data packet detection rule and the second data packet detection rule through matching, so that the data packet can be mapped to an appropriate QoS flow.

In this manner, different QoS flows correspond to different data packet detection rules, and a small change to the data packet detection rule is made, which is more helpful for compatibility with the conventional technology.

2. If the first data packet is the uplink data packet, S302 may be performed by the UE. In this case, the first rule is, for example, a QoS rule.

The UE may obtain the QoS rule in advance. For example, the QoS rule may be generated by an SMF or another network element. For example, the SMF generates the QoS rule. After generating the QoS rule, the SMF may send the QoS rule to the UE, and the UE obtains the QoS rule.

For example, the QoS rule may include a field a, a field b, a field c, a field d, and a field e. The field a may include indication information 1, and the indication information 1 may indicate whether the QoS rule is a default QoS rule (an indication of whether the QoS rule is the default QoS rule). The field b may include an identifier of the QoS rule, for example, a QoS rule identifier (QRI) of the QoS rule. The field c may include a QFI, namely, an identifier of a QoS flow corresponding to the QoS rule. The field d is an optional field, and may include a set of packet filters. For example, after receiving a data packet, the UE may match an IP 5-tuple of the data packet with the set of packet filters included in the field d, to determine whether the QoS rule is applicable to the data packet. If the IP 5-tuple of the data packet successfully matches the set of packet filters included in the field d, the QoS rule may be applicable to the data packet. Otherwise, the QoS rule is not applicable to the data packet. The field e includes a precedence value, indicating a precedence of the QoS rule.

In this embodiment of this application, there may be a plurality of implementations of the QoS rule. The following uses examples for description.

In an optional implementation of the QoS rule, when a quantity of QoS rules is 1, the QoS rule may indicate the first QoS flow and the second QoS flow. The first QoS flow and the second QoS flow are, for example, the correlated QoS flows. For example, the first traffic flow is transmitted by using the first QoS flow and the second QoS flow. Certainly, if the correlated QoS flows include another QoS flow in addition to the first QoS flow and the second QoS flow (for example, if the first traffic flow is transmitted by using the another QoS flow in addition to the first QoS flow and the second QoS flow, the correlated QoS flows further include the another QoS flow in addition to the first QoS flow and the second QoS flow), the another QoS flow may also be indicated by using the QoS rule, and indication manners are similar. For example, a new field is defined in the QoS rule, and the field may carry the QFI. The newly defined field is a different field from the field c, and the newly defined field is, for example, represented as a field f. Alternatively, a bit may be newly defined in the field c of the QoS rule, and the newly defined bit may carry the QFI. For example, a first field of the QoS rule indicates the first QoS flow (for example, the first field carries the QFI of the first QoS flow), and a second field of the QoS rule indicates the second QoS flow (for example, the second field carries the QFI of the second QoS flow). The first field is, for example, an original field (for example, the field c), and the second field is, for example, a newly defined field. Alternatively, the second field is, for example, an original field, and the first field is, for example, a newly defined field (or bit).

FIG. 4B is an example of a QoS rule. The QoS rule includes a field a, a field b, a field c, a field d, and a field e, and further includes a newly added field f. For example, the field c includes the QFI of the first QoS flow (for example, a QFI 1 in FIG. 4B). In other words, the QoS rule indicates the first QoS flow. The field f includes, for example, the QFI of the second QoS flow (for example, a QFI 2 in FIG. 4B). It can be learned that the field f is added, so that the QoS rule can indicate the two QoS rules. For content carried by the other fields, refer to the foregoing descriptions. In FIG. 4B, an example in which the original field of the QoS rule indicates the first QoS flow, and the newly defined field indicates the second QoS flow is used.

Optionally, if the QFI is carried by using the newly defined bit or field, it may implicitly indicate that an importance degree of a data packet transmitted by using a QoS flow corresponding to the QFI is low. If the QFI is carried by using the original field, it implicitly indicates that an importance degree of a data packet transmitted by using a QoS flow corresponding to the QFI is high. In this manner, the UE can map, based on an importance degree of a data packet, the data packet to a QoS flow that matches the importance degree. Alternatively, the QoS rule may further include a first importance degree indication, where the first importance degree indication may indicate that the importance degree of the data packet transmitted by using the first QoS flow is higher than that of the data packet transmitted by using the second QoS flow. Alternatively, the first importance degree indication may indicate that the importance degree of the data packet transmitted by using the first QoS flow is high, for example, it indicates that the first QoS flow is used to transmit important data. In addition, the first importance degree indication may further indicate that the importance degree of the data packet transmitted by using the second QoS flow is low. For example, it indicates that the second QoS flow is used to transmit common data. Alternatively, the first importance degree indication may indicate that the data packet transmitted by using the first QoS flow corresponds to the I frame and/or the P0 frame, and indicate that the data packet transmitted by using the first QoS flow corresponds to the P1 frame and/or the P2 frame. Alternatively, the first importance degree indication may further have another indication manner. The UE can also map, by using the first importance degree indication based on the importance degree of the data packet, the data packet to the QoS flow that matches the importance degree. In addition, if the QoS rule includes the first importance degree indication, an importance degree of a data packet transmitted by using a QoS flow corresponding to the QFI carried by the newly defined bit or field is low, and an importance degree of a data packet transmitted by using a QoS flow corresponding to the QFI carried by the original field is high. Alternatively, an importance degree of a data packet transmitted by using a QoS flow corresponding to the QFI carried by using the newly defined bit or field is high, and an importance degree of a data packet transmitted by using a QoS flow corresponding to the QFI carried by using the original field is low.

For example, the importance degrees of the data packets corresponding to the first traffic flow may be different. The XR application is used as an example. Some or all of the data packets of the XR application are transmitted by using, for example, the first traffic flow, and the first traffic flow is used to transmit both data packets of high importance degrees (for example, data packets/the data packet corresponding to the I frame and/or the P0 frame) and data packets of low importance degrees (for example, data packets/the data packet corresponding to the P1 frame and/or the P2 frame). In this case, the UPF may transmit the data packet of the high importance degree by using the first QoS flow, and transmit the data packet of the low importance degree by using the second QoS flow. If the first QoS flow and second QoS flow are used to transmit data packets of a same traffic flow, it may be considered that the first QoS flow and the second QoS flow are correlated QoS flows. Correspondingly, the QoS rule may indicate the first QoS flow and the second QoS flow. For example, the field f is added to the QoS rule, the field c of the QoS rule carries the QFI of the first QoS flow, and the field f of the QoS rule carries the QFI of the second QoS flow. Alternatively, the field c of the QoS rule carries the QFI of the second QoS flow, and the field f of the QoS rule carries the QFI of the first QoS flow. In this way, after receiving a data packet, the UE may determine, based on an IP 5-tuple of the data packet, whether the QoS rule is applicable to the data packet. If the QoS rule is applicable to the data packet, the UE may map the data packet to the first QoS flow or the second QoS flow for transmission.

In other words, the QoS rule is improved in this manner. One QoS rule originally indicates one QoS flow. However, in this embodiment of this application, because there are correlated QoS flows, and the correlated QoS flows are used to transmit data packets of a same traffic flow, the data packet detection rule may indicate the correlated QoS flows. The correlated QoS flows include, for example, the at least two QoS flows. The data packets of the same traffic flow may carry a same IP 5-tuple. Therefore, a same QoS rule may be applied to these data packets. In this way, there is no need to set a plurality of QoS rules for the data packets of the same traffic flow. This can simplify a process of setting the QoS rules, and reduce an amount of information maintained by the UPF.

In another optional implementation of the QoS rule, the QoS rule may include a first QoS rule and a second QoS rule. The first QoS rule indicates the first QoS flow in the correlated QoS flows, and the second QoS rule indicates the second QoS flow in the correlated QoS flows. This is an example in which the correlated QoS flows include the first QoS flow and the second QoS flow. In addition to different indicated QoS flows, other parameters included in the first QoS rule and the second QoS rule may be the same (for example, the first QoS rule and the second QoS rule may include a same set of packet filters), or may be different. This is not limited in this embodiment of this application. For example, in addition to indicating the first QoS flow, the first QoS rule may further indicate the importance degree of the data packet transmitted by using the first QoS flow, or indicate a frame type corresponding to the data packet transmitted by using the first QoS flow (in other words, indicate a service corresponding to the data packet transmitted by using the first QoS flow). An example in which the first application is the XR application is used. For example, the first QoS rule indicates that the importance degree of the data packet transmitted by using the first QoS flow is high, or the first QoS rule may indicate the I frame and/or the P0 frame (indicating the I frame and/or the P0 frame may be considered as indicating a frame type, or may be considered as indicating a first-type service). An implementation of the second QoS rule is also similar. Optionally, in addition to indicating the second QoS flow, the second QoS rule may further indicate the importance degree of the data packet transmitted by using the second QoS flow, or indicate a frame type corresponding to the data packet transmitted by using the second QoS flow (in other words, indicate a service corresponding to the data packet transmitted by using the second QoS flow), for example, indicate a second-type service, where the second-type service has a low importance degree. An example in which the first application is the XR application is used. For example, the second QoS rule indicates that the importance degree of the data packet transmitted by using the second QoS flow is low, or the second QoS rule may indicate the P1 frame and/or the P2 frame (indicating the P1 frame and/or the P2 frame may be considered as indicating a frame type, or may be considered as indicating the second-type service).

FIG. 4C is an example of a QoS rule. The QoS rule is, for example, the first QoS rule, and an implementation of the second QoS rule is also similar. For example, the first QoS rule includes a field a, a field b, a field c, a field d, and a field e, and further includes a newly added field f. The field f may indicate the importance degree of the data packet transmitted by using a QoS flow indicated by the first QoS rule, or indicate a frame type corresponding to the data packet transmitted by using the QoS flow indicated by the first QoS rule. For example, the field c includes a QFI (a QFI 1 in FIG. 4C) of the first QoS flow, in other words, the QoS rule indicates the first QoS flow, and the field f indicates the I frame and the P0 frame. For content carried by the other fields, refer to the foregoing descriptions.

For example, the importance degrees of the data packets corresponding to the first traffic flow may be different. The XR application is used as an example. Some or all of the data packets of the XR application are transmitted by using, for example, the first traffic flow, and the first traffic flow is used to transmit both the data packets of the high importance degrees (for example, the data packets/the data packet corresponding to the I frame and/or the P0 frame) and the data packets of the low importance degrees (for example, the data packets/the data packet corresponding to the P1 frame and/or the P2 frame). In this case, the UPF may transmit the data packet of the high importance degree by using the first QoS flow, and transmit the data packet of the low importance degree by using the second QoS flow. The first QoS flow and the second QoS flow are the correlated QoS flows. Correspondingly, the QoS rule may include the first QoS rule and the second QoS rule. The first QoS rule indicates the first QoS flow. For example, a field c of the first QoS rule carries the QFI of the first QoS flow. The second QoS rule indicates the second QoS flow. For example, a field c of the second QoS rule carries the QFI of the second QoS flow. It can be learned that because one QoS rule indicates one QoS flow, a field does not need to be added to the QoS rule. In this way, after obtaining a data packet, the UE may determine, based on an IP 5-tuple of the data packet, a QoS rule applicable to the data packet. For example, both the first QoS rule and the second QoS rule are applicable to the data packet. The UE may further determine, from the first QoS rule and the second QoS rule, the QoS rule applicable to the data packet (for example, determine the QoS rule applicable to the data packet based on an importance degree of the data packet), and map the data packet to a QoS flow indicated by the QoS rule, where the QoS flow indicated by the QoS rule is the first QoS flow or the second QoS flow.

In addition, when matching an IP 5-tuple of a data packet with QoS rules, the UE generally performs sequential matching based on precedences of the QoS rules. For example, an IP 5-tuple of a data packet can match both the first QoS rule and the second QoS rule, but the data packet has a low importance degree, the data packet should be mapped to the second QoS flow for transmission. However, for example, if a precedence of the first QoS rule is higher than that of the second QoS rule, the UE may first determine that the data packet matches the first QoS rule. In this case, two cases may occur. One case is: Although the importance degree of the data packet does not match an importance degree of a data packet transmitted by using a QoS flow indicated by the first QoS rule, because only the first QoS rule is matched in this case, the UE still maps the data packet to the first QoS flow for transmission. This may cause data packet transmission disorder. The other case is: Because the importance degree of the data packet does not match the importance degree of the data packet transmitted by using the QoS flow indicated by the first QoS rule, the UE may consider that a transmission error occurs, and may discard the data packet. This may further cause packet loss. In view of this, optionally, in this embodiment of this application, if this implementation is used for the QoS rule, the precedence of the first QoS rule may be the same as the precedence of the second QoS rule. In this way, when matching a data packet with a QoS rule, the UE may obtain the first QoS rule and the second QoS rule through matching, so that the data packet can be mapped to an appropriate QoS flow.

In this manner, different QoS flows correspond to different QoS rules, and a small change to the QoS rule is made, which is more conducive to compatibility with the conventional technology.

S3022: Map the first data packet to a QoS flow that is indicated by the first rule and that matches the importance degree of the first data packet for transmission.

1. If the first data packet is the downlink data packet, S3022 may be performed by the UPF.

The UPF may parse the data packet to determine the importance degree of the data packet. For example, a packet header of the data packet may include information indicating the importance degree of the data packet. An example in which the data packet is a data packet of the XR application is used. The packet header of the data packet may indicate a frame corresponding to the data packet, for example, indicate that the data packet corresponds to the I frame, the P0 frame, the P1 frame, or the P2 frame. In this case, that the UPF determines the frame corresponding to the data packet means that the UPF determines the importance degree of the data packet. For example, if the data packet corresponds to the I frame or the P0 frame, the UPF determines that the importance degree of the data packet is high. If the data packet corresponds to the P1 frame or the P2 frame, the UPF determines that the importance degree of the data packet is low.

For example, the quantity of data packet detection rules is 1. The data packet detection rule indicates the first QoS flow and the second QoS flow, and the UPF determines that the importance degree of the data packet transmitted by using the first QoS flow is high, and the importance degree of the data packet transmitted by using the second QoS flow is low. In this case, if the UPF determines, based on the IP 5-tuple of the first data packet, that the data packet detection rule is applicable to the first data packet, and determines that the importance degree of the first data packet is high, the UPF maps the first data packet to the first QoS flow. If the UPF determines that the importance degree of the first data packet is low, the UPF maps the first data packet to the second QoS flow.

For another example, the data packet detection rule includes the first data packet detection rule and the second data packet detection rule. The first data packet detection rule indicates the first QoS flow, and the second data packet detection rule indicates the second QoS flow. The first data packet detection rule indicates the first-type service, and the second data packet detection rule indicates the second-type service. The importance degree of the first service is high, and the importance degree of the second service is low. In this case, if the UPF determines, based on the IP 5-tuple of the first data packet, that the first data packet matches the first data packet detection rule and the second data packet detection rule, and determines that the importance degree of the first data packet is high, the UPF determines that the first data packet detection rule is applicable to the first data packet, and the UPF may map the first data packet to the first QoS flow indicated by the first data packet detection rule. If the UPF determines, based on the IP 5-tuple of the first data packet, that the first data packet matches the first data packet detection rule and the second data packet detection rule, and determines that the importance degree of the first data packet is low, the UPF may map the first data packet to the second QoS flow indicated by the second data packet detection rule.

2. If the first data packet is the uplink data packet, S3022 may be performed by the UE.

The modem of the UE may parse the data packet to determine the importance degree of the data packet. For content of this part, refer to the foregoing descriptions.

For example, the quantity of QoS rules is 1. The QoS rule indicates the first QoS flow and the second QoS flow, and the importance degree of the data packet transmitted by using the first QoS flow is high, and the importance degree of the data packet transmitted by using the second QoS flow is low. In this case, if the UE determines, based on the IP 5-tuple of the first data packet, that the QoS rule is applicable to the first data packet and determines that the importance degree of the first data packet is high, the UE maps the first data packet to the first QoS flow. If the UE determines that the importance degree of the first data packet is low, the UE maps the first data packet to the second QoS flow.

For another example, the QoS rule includes the first QoS rule and the second QoS rule. The first QoS rule indicates the first QoS flow, and the second QoS rule indicates the second QoS flow. The first QoS rule indicates the first-type service, and the second QoS rule indicates the second-type service. The importance degree of the first service is high, and the importance degree of the second service is low. In this case, if the UE determines, based on the IP 5-tuple of the first data packet, that the first data packet matches the first QoS rule and the second QoS rule, and determines that the importance degree of the first data packet is high, the UE determines that the first QoS rule is applicable to the first data packet, and the UE may map the first data packet to the first QoS flow indicated by the first QoS rule. If the UE determines, based on the IP 5-tuple of the first data packet, that the first data packet matches the first QoS rule and the second QoS rule, and determines that the importance degree of the first data packet is low, the UE determines that the second QoS rule is applicable to the first data packet, and the UE may map the first data packet to the second QoS flow indicated by the second QoS rule.

In this embodiment of this application, the first traffic flow corresponding to the application may be transmitted by using the at least two QoS flows. For example, different QoS flows may be used to transmit data packets of different importance degrees. In this way, the traffic flow can be controlled, for example, sending of the more important data packet is preferentially ensured, to improve transmission reliability of these data packets, and ensure service experience of the user. In addition, only one traffic flow needs to be transmitted between a transmit end and a receive end, for example, the transmit end or the receive end is an application server. In this case, a working mode of the application server is slightly changed, so that the application server can work according to the existing protocol as much as possible, and can be better compatible with the existing protocol.

Figure 5:
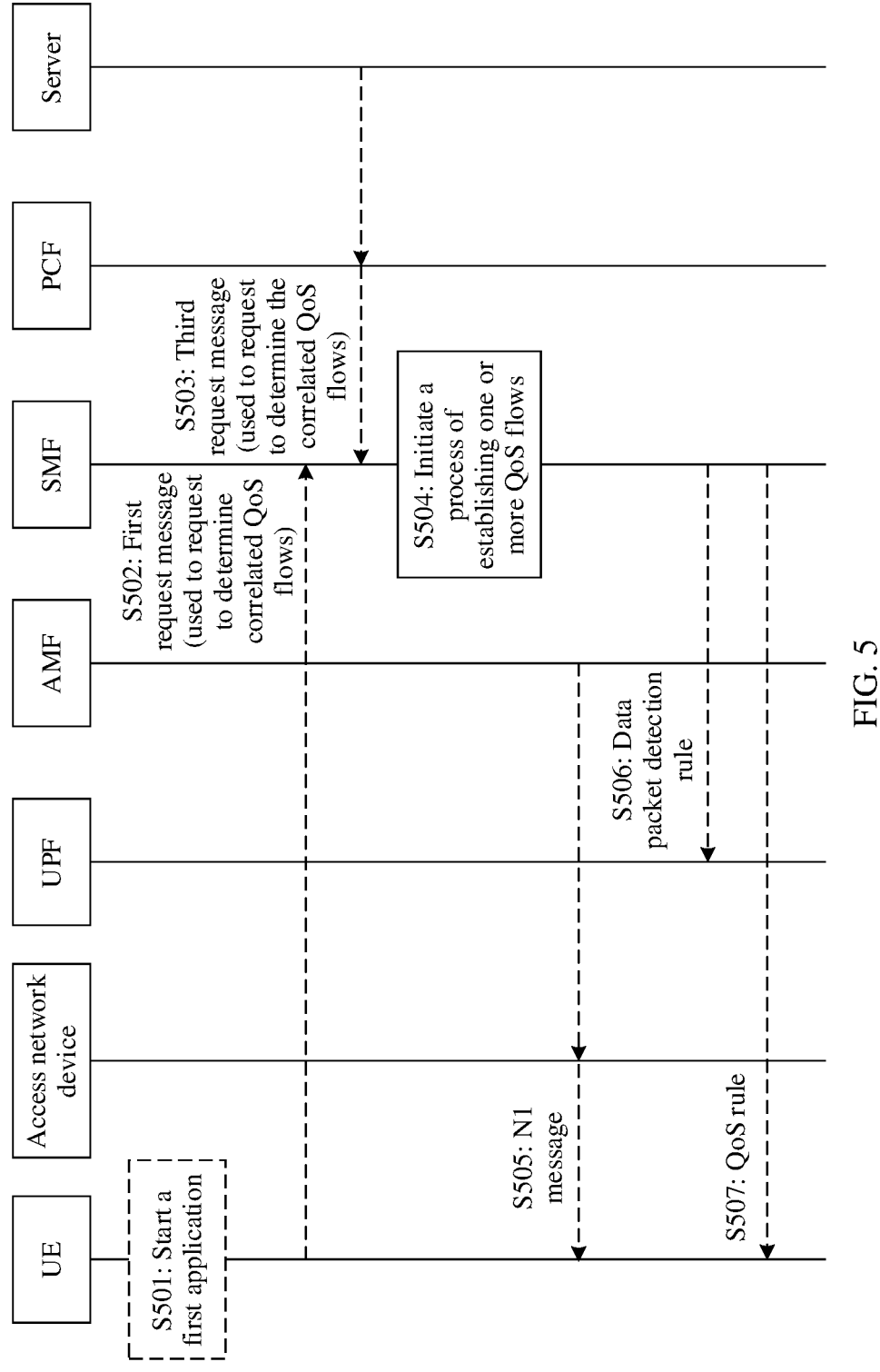
FIG. 5 is a flowchart of a second communication method according to an embodiment of this application.

It is mentioned in the embodiment shown in FIG. 3 that the data packets of the same traffic flow may be transmitted between the UPF and the UE by using the correlated QoS flows, and the correlated QoS flows may include the at least two QoS flows. The following describes a second communication method provided in embodiments of this application. The method describes how to establish correlated QoS flows. The correlated QoS flows in the embodiment shown in FIG. 3 may be established by using the method in the embodiment shown in FIG. 5, in other words, the embodiment shown in FIG. 3 and the embodiment shown in FIG. 5 may be applied in combination. Alternatively, the correlated QoS flows in the embodiment shown in FIG. 3 may not be established by using the method in the embodiment shown in FIG. 5, but the correlated QoS flows are established in another manner, to be specific, the embodiment shown in FIG. 3 and the embodiment shown in FIG. 5 may not be combined, and applied independently of each other. FIG. 5 is a flowchart of the method.

S501: UE starts a first application, in other words, the UE invokes the first application. For example, S501 is specifically: The UE invokes a sub-application in the first application. The first application is, for example, a game application, a video application, or a shopping application. This is not limited in this embodiment of this application. For example, the first application is the video application. S501 is, for example, that the UE further opens a link in the video application, for example, opens a movie in the video application.

For example, the UE establishes, through a data channel provided by a session corresponding to the first application, a socket connection with a server that provides the first application, and performs an application layer media negotiation process, for example, negotiates a media stream format of the first application by using a hypertext transfer protocol (HTTP). A 5G system is used as an example. For example, the session corresponding to the first application is a protocol data unit (PDU) session. If the technical solutions provided in embodiments of this application are applied to another system, the session may alternatively be another type of session. In this embodiment of this application, that the session is the PDU session is used as an example.

S502: The UE sends a request message 1 to an SMF. Correspondingly, the SMF receives the request message 1 from the UE. The request message 1 may also be referred to as a first request message.

The first request message may include requirement information. The requirement information may indicate a QoS requirement of correlated QoS flows, or the requirement information may indicate a requirement of a traffic flow transmitted by using the correlated QoS flows. Optionally, the first request message may further include IP 5-tuple information and the like that are related to the first application.

For example, the UE may determine, according to a correlation rule, that the first application needs to use the correlated QoS flows for transmission. The correlation rule is a rule for establishing the correlated QoS flows, and the rule for establishing the correlated QoS flows may indicate information about the traffic flow that allows establishment of the correlated QoS flows. For example, the UE may determine, according to the correlation rule, data that can use the correlated QoS flows. For example, the information about the traffic flow that allows establishment of the correlated QoS flows includes one or more of the following: information about applications corresponding to the traffic flow, an IP address of the traffic flow, an identifier of a network slice accessed by a session of the traffic flow, a transmission bandwidth of the traffic flow, a delay requirement of the traffic flow, a media coding format of the traffic flow, a media type of the traffic flow, or a service type of the traffic flow (for example, the traffic flow is a service corresponding to an XR application). For example, the rule for establishing the correlated QoS flows indicates the information about the application corresponding to the traffic flow that allows establishment of the correlated QoS flows, and the information about the applications indicated by the rule includes information about the first application. In this case, the UE determines, based on the information about the first application (for example, an identifier of the first application), that the first application uses the correlated QoS flows for transmission. For another example, the rule for establishing the correlated QoS flows indicates the service type of the traffic flow that allows establishment of the correlated QoS flows, and the service type indicated by the rule includes a service type (for example, the service corresponding to the XR application) of a traffic flow of the first application. In this case, the UE determines, based on the service type of the traffic flow of the first application, that the first application uses the correlated QoS flows for transmission. For still another example, the rule for establishing the correlated QoS flows indicates the transmission bandwidth of the traffic flow that allows establishment of the correlated QoS flows, and the transmission bandwidth indicated by the rule includes a transmission bandwidth of the traffic flow of the first application. In this case, the UE determines, based on the transmission bandwidth of the traffic flow of the first application, that the first application uses the correlated QoS flows for transmission.

The correlation rule is also referred to as a correlated QoS flow rule (CQF rule), or may have another name. This is not limited in this embodiment of this application. More content about the correlation rule, for example, a process in which the UE obtains the correlation rule, is described in other embodiments below.

The UE may send the first request message to the SMF. The first request message is, for example, a PDU session modification request, or the first request message may be implemented by using another message. For example, the UE may send the first request message to an AMF, and the AMF sends the first request message to the SMF. Therefore, the UE is equivalent to sending the first request message to the SMF, and the SMF is equivalent to receiving the first request message from the UE. If the UE determines that the first application uses the correlated QoS flows for transmission, the first request message may be used to request to determine the correlated QoS flows. The correlated QoS flows may include at least two QoS flows, and the correlated QoS flows may be used to transmit traffic flows corresponding to one application, or the correlated QoS flows may be used to transmit a same traffic flow.

When the correlated QoS flows include the at least two QoS flows, the at least two QoS flows may be created, or some QoS flows in the at least two QoS flows may be created. For a remaining QoS flow in the at least two QoS flows, a previously established QoS flow may be used. This can simplify a process of establishing QoS flows, and reduce overheads caused by establishing the QoS flows. Optionally, the rule for establishing the correlated QoS flows (or the correlation rule) may further indicate a quantity of created QoS flows. For example, the correlation rule indicates to create (or establish) the QoS flow, and indicates the quantity of created QoS flows. The created QoS flow and at least one established QoS flow are correlated QoS flows, or the created QoS flows are correlated QoS flows (the quantity of created QoS flows is greater than 1). For example, if one created QoS flow is indicated, it is equivalent to implicitly indicating that the QoS flow and the at least one established QoS flow are correlated QoS flows. Alternatively, if a plurality of created QoS flows are indicated, the plurality of QoS flows are correlated QoS flows, or the plurality of QoS flows and the at least one established QoS flow are correlated QoS flows. For example, if the correlation rule indicates to create two QoS flows for the application 1, or indicates to create two QoS flows for the first traffic flow of the application 1, the two QoS flows are correlated QoS flows; or the two QoS flows and the at least one established QoS flow are correlated QoS flows. For another example, if the correlation rule indicates to create one QoS flow for an application 2, or indicates to create one QoS flow for a first traffic flow of the application 2, the QoS flow and the at least one established QoS flow are correlated QoS flows.

The first request message may indicate the quantity of created QoS flows, or may not indicate the quantity of created QoS flows. For example, if the correlation rule indicates the quantity of created QoS flows, optionally, the first request message may also indicate the quantity of created QoS flows. For example, if the correlation rule indicates to create two QoS flows for the first application, or indicates to create two QoS flows for the first traffic flow of the first application, the first request message may indicate to create two QoS flows. This is equivalent to that the UE may indicate the quantity of created QoS flows by using the first request message, and the quantity of created QoS flows does not need to be determined by the SMF, thereby simplifying work of the SMF. However, if the correlation rule does not indicate the quantity of created QoS flows, the first request message may not indicate the quantity of created QoS flows, or although the correlation rule indicates the quantity of created QoS flows, the first request message may not indicate the quantity of created QoS flows.

If the first request message does not indicate the quantity of created QoS flows, the requirement information included in the first request message may indicate the requirement of the traffic flow transmitted by using the correlated QoS flows. For example, the requirement information indicates that the traffic flow (for example, the first traffic flow) transmitted by using the QoS flows that need to be correlated is a 4K video or a 1080p video, and the SMF may determine, based on the requirement information, the quantity of QoS flows that need to be created for the traffic flow.

If the first request message indicates the quantity of created QoS flows, the requirement information included in the first request message may also be referred to as QoS requirement information, and the QoS requirement information may indicate a QoS requirement of the created QoS flow.

For example, if the first request message indicates to create one QoS flow, the QoS requirement information may include description information of the created QoS flow (QoS flow description), and may further include a QFI of the at least one QoS flow. The at least one QoS flow and the QoS flow are correlated QoS flows, and the at least one QoS flow is an established QoS flow. This is equivalent to that the QoS requirement information may indicate to correlate the created QoS flow with specific QoS flows. The at least one QoS flow may be originally used to transmit the first application (or the first traffic flow). For example, if the QoS flows have been established for the first application (or the first traffic flow), the QoS flows may be used to continue transmitting the first application (or the first traffic flow). Alternatively, the at least one QoS flow is not originally used to transmit the first application (or the first traffic flow), but is used to transmit another application (or another traffic flow, where the another traffic flow may include a traffic flow of the first application other than the first traffic flow and/or a traffic flow of the another application), but now the first application (or the first traffic flow) is transmitted by using the at least one QoS flow.

For another example, if the first request message indicates to create two QoS flows, the QoS requirement information may include description information of the two created QoS flows, and may further include a QFI of the at least one QoS flow. The at least one QoS flow and the two created QoS flows are correlated QoS flows, and the at least one QoS flow is an established QoS flow. This is equivalent to that the QoS requirement information may indicate to correlate the created QoS flows with specific QoS flows. Alternatively, if the created QoS flows are not correlated with the established QoS flow, but the created QoS flows are correlated with each other, the QoS requirement information may include description information of the two created QoS flows, or may include 5G QoS identifiers (5QIs) of the two created QoS flows. The 5QIs may correspond to two groups of QoS parameters. Optionally, the first request message may further include a correlation indication, and the correlation indication may indicate that the two created QoS flows are correlated QoS flows. Alternatively, if the first request message indicates to create a plurality of QoS flows, it implicitly indicates that the plurality of QoS flows are correlated QoS flows, and the first request message may not need to include the correlation indication.

Optionally, description information of one QoS flow includes, for example, one or more of the following: a 5QI of the QoS flow, a guaranteed flow bit rate (GFBR) of the QoS flow, a maximum flow bit rate (MFBR) of the QoS flow, or an averaging window of the QoS flow.

S503: A server sends a request message 2 to the SMF. Correspondingly, the SMF receives the request message 2 from the server. The request message 2 may also be referred to as a third request message.

S502 and S503 are two parallel steps, and only one step needs to be performed in one execution procedure. Which step is to be performed is, for example, negotiated by the UE and the server, or specified by using a protocol. S502 and S503 may be considered as optional steps for each other, but S503 is represented by a dashed line in FIG. 5.

The third request message may include requirement information, and the requirement information may indicate a requirement of a traffic flow transmitted by using correlated QoS flows. For example, the requirement information indicates that the traffic flow transmitted by using the QoS flows that need to be correlated is a 4K video or a 1080P video, and the SMF may determine, based on the requirement information, a quantity of QoS flows that need to be created for the traffic flow. Optionally, the third request message may further include IP 5-tuple information and the like that are related to the first application.

The third request message is, for example, a session management (SM) policy-related modification request, or may be another type of message. For example, the server may send the third request message to a PCF, and then the PCF sends the third request message to the SMF. Therefore, the server is equivalent to sending the third request message to the SMF, and the SMF is equivalent to receiving the third request message from the server. If the server determines that the first application uses the correlated QoS flows for transmission, the third request message may be used to request to determine the correlated QoS flows. The correlated QoS flows may include at least two QoS flows, and the correlated QoS flows may be used to transmit traffic flows corresponding to one application, or the correlated QoS flows may be used to transmit a same traffic flow.

S504: The SMF initiates a process of establishing one or more QoS flows based on the requirement information. If the SMF initiates a process of establishing one QoS flow, the QoS flow and the at least one established QoS flow are correlated QoS flows. Alternatively, if the SMF initiates a process of establishing a plurality of QoS flows, the plurality of QoS flows are correlated QoS flows, or the plurality of QoS flows and the at least one established QoS flow are correlated QoS flows.

For example, if the SMF receives the first request message, the SMF may initiate the process of establishing one or more QoS flows based on the requirement information included in the first request message. Alternatively, if the SMF receives the third request message, the SMF may initiate the process of establishing one or more QoS flows based on the requirement information included in the third request message.

If the SMF receives the first request message, as described in S502, the first request message may further indicate the quantity of created QoS flows. In this case, the SMF does not need to determine the quantity of created QoS flows, and creates a corresponding quantity of QoS flows based on an indication of the first request message. In addition, if the created QoS flow and the at least one established QoS flow are correlated QoS flows, the QoS requirement information included in the first request message may further include the QFI of the at least one QoS flow. This is equivalent to that the UE has determined which QoS flows are correlated QoS flows, and the SMF does not need to determine which QoS flows are correlated QoS flows.

Alternatively, if the SMF receives the third request message, or if the first request message does not indicate the quantity of created QoS flows, the SMF may determine the quantity of created QoS flows based on the received requirement information, and may further determine whether to correlate the created QoS flow with the established QoS flow. If the created QoS flow needs to be correlated with the created QoS flow, the SMF may further determine which QoS flows are specifically correlated. For example, the SMF determines that the created QoS flow needs to be correlated with the established QoS flow. Each QoS flow has a corresponding level. Therefore, the SMF may determine, based on a level of the established QoS flow, to correlate the created QoS flow with which established QoS flows. For example, a QoS flow created by the SMF is used to transmit a data packet of a high importance degree, and a QoS flow correlated with the created QoS flow may be used to transmit a data packet of a low importance degree. In this case, the SMF may select, from the established QoS flows, a QoS flow with a low level to correlate with the created QoS flow. Alternatively, a QoS flow created by the SMF is used to transmit a traffic flow of a low importance degree, and a QoS flow correlated with the created QoS flow may be used to transmit a data packet of a high importance degree. In this case, the SMF may select, from the established QoS flows, a QoS flow with a high level to correlate with the created QoS flow. The QoS flow that is correlated with the created QoS flow and that is selected by the SMF may be a QoS flow that is originally used to transmit the first application (or the first traffic flow), or may be a QoS flow that is not originally used to transmit the first application (or the first traffic flow).

In this embodiment of this application, there may be a plurality of cases in which the SMF initiates a QoS flow establishment process. The following uses examples for description.

1. In a first case, the SMF initiates the process of establishing the plurality of QoS flows, in other words, the SMF creates the plurality of QoS flows. In this embodiment of this application, an example in which the SMF creates two QoS flows is used. If the SMF needs to create more QoS flows, a manner is also similar. In the following description process, an example in which created QoS flows are correlated with each other and are not correlated with the established QoS flow is used. If the created QoS flows are correlated with the established QoS flow, refer to the following descriptions of the process that is of establishing one QoS flow and that is initiated by the SMF. A method is similar.

For example, the two created QoS flows initiated by the SMF are a first QoS flow and a second QoS flow, and an importance degree of a data packet transmitted by using the first QoS flow is higher than that of a data packet transmitted by using the second QoS flow. In the first case, the SMF may set a first rule corresponding to the first QoS flow, and does not set a corresponding rule for the second QoS flow. For example, the first rule includes a first field and a second field. The first field may indicate the first QoS flow, and the second field may indicate the second QoS flow. The first field is an original field, and the second field is a newly defined field; or the first field is a newly defined field, and the second field is an original field. In addition, content of a packet filter included in the first rule is, for example, information such as the IP 5-tuple of the first application included in the first request message or the third request message. In other words, the SMF only needs to set one rule, and the rule may indicate the first QoS flow and the second QoS flow. In addition, corresponding rules do not need to be respectively set for different QoS flows. This can reduce a quantity of set rules.

The rule described herein is, for example, the QoS rule or the data packet detection rule described in the embodiment shown in FIG. 3. For example, the first rule is the QoS rule. In this case, an original field in the QoS rule is, for example, a field c in the QoS rule, and a newly defined field is, for example, a field f in the QoS rule. In other words, the QoS rule originally does not include the field f. Therefore, one QoS rule indicates one QoS flow. However, in this embodiment of this application, to enable the QoS rule to indicate the first QoS flow and the second QoS flow, the field f may be newly defined in the QoS rule, so that the two QoS flows may be indicated by using the field c and the field f. For example, the field c of the QoS rule indicates the first QoS flow, and the field f indicates the second QoS flow. In other words, the original field indicates a QoS flow of a high importance degree, and the newly defined field indicates a QoS flow of a low importance degree. Therefore, the UE can determine, by using a field in the QoS rule, an importance degree that matches a QoS flow, to map a data packet to the corresponding QoS flow. Alternatively, the QoS rule may include a first importance degree indication, to indicate an importance degree of a data packet transmitted by using a QoS flow corresponding to the QoS rule. The UE can also map the data packet to the corresponding QoS flow by using the first importance degree indication. For content of this part, refer to the embodiment shown in FIG. 3.

For another example, the first rule is the data packet detection rule, and the data packet detection rule is, for example, a PDR. An original field in the PDR is, for example, a field that is originally used to carry a QFI and that is in PDI included in the PDR, and a newly defined field in the PDR is, for example, a newly added field (or bit) that is used to carry the QFI and that is in the PDI included in the PDR. In other words, the bit included in the PDI can be originally used to carry only one QFI. However, in this embodiment of this application, to enable the PDR to indicate the first QoS flow and the second QoS flow, the field (or bit) may be newly defined in the PDR, so that the original field (or bit) and the newly defined field (or bit) may indicate the two QoS flows. For example, the original field (or bit) indicates a QoS flow of a high importance degree, and the newly defined field (or bit) indicates a QoS flow of a low importance degree. Therefore, a UPF can determine an importance degree that matches a QoS flow by using the field (or bit) in the PDR, to map a data packet to the corresponding QoS flow. Alternatively, the data packet detection rule may also include a first importance degree indication, to indicate an importance degree of a data packet transmitted by using a QoS flow corresponding to the data packet detection rule. The UPF can also map the data packet to the corresponding QoS flow by using the first importance degree indication. For content of this part, refer to the embodiment shown in FIG. 3.

2. In a second case, the SMF initiates the process of establishing one QoS flow, in other words, the SMF creates one QoS flow. For example, the QoS flow is a first QoS flow.

The SMF correlates the first QoS flow with the at least one established QoS flow. For example, the SMF may store a correlation relationship between a QFI of the first QoS flow and the QFI of the at least one QoS flow, to correlate the first QoS flow with the at least one QoS flow. For example, the at least one QoS flow is 1. The QoS flow is referred to as, for example, a second QoS flow. For example, the SMF determines the second QoS flow based on the first request message, or the SMF may determine the second QoS flow by itself. For example, an importance degree of a data packet transmitted by using the first QoS flow is higher than that of a data packet transmitted by using the second QoS flow.

The SMF sets a first rule for the first QoS flow, and content of a packet filter included in the first rule is, for example, the information such as the IP 5-tuple of the first application included in the first request message or the third request message. In addition, because the second QoS flow is the established QoS flow, the second QoS flow may have a corresponding rule. For example, the rule is referred to as a second rule. If the second QoS flow is originally used to transmit the first application (or the first traffic flow), the second rule may include mapping information (or referred to as matching information) corresponding to the first application (or the first traffic flow). The mapping information corresponding to the first application (or the first traffic flow) includes, for example, the information such as the IP 5-tuple of the first application (or the first traffic flow). However, when the first application (or the first traffic flow) is previously transmitted by using the second rule, the corresponding IP 5-tuple may be different from an IP 5-tuple corresponding to the first application (or the first traffic flow) when the first rule is used for transmission. Therefore, the SMF may delete the mapping information that is included in the second rule and that corresponds to the first application (or the first traffic flow). If there is a data packet corresponding to the first application (or the first traffic flow) subsequently, the UE or the UPF may determine, based on an IP 5-tuple of the data packet, that the data packet corresponds to the first rule, and determine, based on the correlation relationship stored in the SMF, that the data packet further corresponds to the second QoS flow indicated by the second rule. There is no need to perform matching based on the IP 5-tuple included in the second rule, to reduce a matching failure case. In addition, in this case, if the UE successfully matches the IP 5-tuple of the data packet with the first rule, but does not match the second rule, it may be considered that it implicitly indicates that the first QoS flow indicated by the first rule matches a traffic flow of a high importance degree, and the second QoS flow indicated by the second rule matches a traffic flow of a low importance degree, so that the UE can map a data packet to an appropriate QoS flow. Alternatively, an implicit indication relationship may not exist. For example, the SMF further adds a first importance degree indication to the first rule and/or the second rule, where the first importance degree indication may indicate that the importance degree of the data packet transmitted by using the first QoS flow is higher than that of the data packet transmitted by using the second QoS flow. Alternatively, the first importance degree indication may indicate that the importance degree of the data packet transmitted by using the first QoS flow is high, and the importance degree of the data packet transmitted by using the second QoS flow is low. Alternatively, the first importance degree indication may indicate that the data packet transmitted by using the first QoS flow corresponds to an I frame and/or a P0 frame, and indicate that the data packet transmitted by using the first QoS flow corresponds to a P1 frame and/or a P2 frame.

Alternatively, the first importance degree indication may further have another indication manner. Therefore, the UE can also map the data packet to the appropriate QoS flow based on the first importance degree indication. For the content, reference may also be made to the embodiment shown in FIG. 3. The rule described herein is, for example, the QoS rule or the data packet detection rule.

An example in which the rule is the QoS rule is used. For example, the SMF creates the first QoS flow, and determines that the first QoS flow and the established second QoS flow are correlated QoS flows. The second QoS flow corresponds to a second QoS rule, and the second QoS rule originally includes two packet filters: packet filter-1 (IP 1, IP 1', Port 1, Port 1', UDP), and packet filter-2 (IP 2, IP 2', Port 2, Port 2', UDP), where the packet filter-1 corresponds to the first application (or the first traffic flow). The SMF sets the first rule for the first QoS flow, and the first rule includes, for example, a packet filter-3 (IP 1, IP 1', Port 1, Port 1', UDP). In this case, the SMF may delete the packet filter-1 in the second rule. When there is an uplink data packet subsequently, the UE may map the data packet to the first QoS flow or the second QoS flow based on the packet filter-3, without matching an IP 5-tuple of the data packet with the packet filter in the second rule.

Certainly, if the second rule is not originally used to transmit the first application (or the first traffic flow), the second rule may not include the mapping information corresponding to the first application (or the first traffic flow), and therefore the SMF does not need to perform a deletion operation.

3. In a third case, the SMF initiates the process of establishing one QoS flow, in other words, the SMF creates one QoS flow. For example, the QoS flow is a second QoS flow. The SMF correlates the second QoS flow with the at least one established QoS flow. For example, the SMF may store a correlation relationship between a QFI of the second QoS flow and the QFI of the at least one QoS flow, to correlate the second QoS flow with the at least one QoS flow. For example, the at least one QoS flow is 1, and the QoS flow is referred to as, for example, a first QoS flow. For example, the SMF determines the first QoS flow based on the first request message, or the SMF may determine the first QoS flow by itself. For example, an importance degree of a data packet transmitted by using the first QoS flow is higher than that of a data packet transmitted by using the second QoS flow.

In this case, the SMF may not need to set a corresponding rule for the second QoS flow, but enable the second QoS flow to use a rule of the first QoS flow. For example, the rule is referred to as a first rule. To enable the first rule to indicate the second QoS flow, the SMF may update the first rule. For example, an updated first rule includes a newly defined field (or bit). Therefore, a first field of the first rule may indicate the first QoS flow, and a second field of the first rule may indicate the second QoS flow. The first field is an original field (or bit), and the second field is a newly defined field (or bit); or the second field is an original field (or bit), and the first field is a newly defined field (or bit). It may be understood that the first rule before the update and the updated first rule each include the original field, and the updated first rule includes the newly defined field in addition to the original field. In this manner, a new rule does not need to be set. Instead, after the original rule is improved, the original rule can indicate the correlated QoS flows. This can reduce a quantity of set rules. The rule described herein is, for example, a QoS rule or a data packet detection rule.

For example, if the first QoS flow is indicated by using the original field, and the second QoS flow is indicated by using the newly defined field, it may implicitly indicate that an importance degree of a data packet transmitted by using the first QoS flow is high, and an importance degree of a data packet transmitted by using the second QoS flow is low.

For example, the first rule is the QoS rule. In this case, an original field in the QoS rule is, for example, a field c in the QoS rule, and a newly added field is, for example, a field f in the QoS rule. In other words, in this embodiment of this application, to enable the QoS rule to indicate the first QoS flow and the second QoS flow, the field f may be added to the QoS rule. For example, the field c indicates the first QoS flow, and the field f indicates the second QoS flow. Therefore, the QoS rule may indicate the two QoS flows. The original field indicates a QoS flow of a high importance degree, and the newly added field indicates a QoS flow of a low importance degree, so that the UE can determine, by using a field in the QoS rule, an importance degree that matches a QoS flow, to map a data packet to the corresponding QoS flow.

For another example, the first rule is the data packet detection rule, and the data packet detection rule is, for example, a PDR. An original field in the PDR is, for example, a field that is originally used to carry a QFI and that is in PDI included in the PDR, and a newly added field in the PDR is, for example, a newly added field (or bit) that is used to carry the QFI and that is in the PDI included in the PDR. In other words, in this embodiment of this application, to enable the PDR to indicate the first QoS flow and the second QoS flow, the field (or bit) may be added to the PDR. The original bit in the PDI may indicate the first QoS flow, and the newly added bit in the PDI may indicate the second QoS flow. Therefore, the PDR may indicate the two QoS flows. The original field indicates a QoS flow of a high importance degree, and the newly added field indicates a QoS flow of a low importance degree, so that the UPF can determine, by using a field in the PDR, an importance degree that matches a QoS flow, to map a data packet to the corresponding QoS flow.

Alternatively, an implicit indication relationship may not exist. For example, the SMF further adds a first importance degree indication to the first rule, where the first importance degree indication may indicate that the importance degree of the data packet transmitted by using the first QoS flow is higher than that of the data packet transmitted by using the second QoS flow. Alternatively, the first importance degree indication may indicate that the importance degree of the data packet transmitted by using the first QoS flow is high, and the importance degree of the data packet transmitted by using the second QoS flow is low. Alternatively, the first importance degree indication may indicate that the data packet transmitted by using the first QoS flow corresponds to an I frame and/or a P0 frame, and indicate that the data packet transmitted by using the first QoS flow corresponds to a P1 frame and/or a P2 frame. Alternatively, the first importance degree indication may further have another indication manner. Therefore, the UE can also map the data packet to the appropriate QoS flow based on the first importance degree indication. For the content, reference may also be made to the embodiment shown in FIG. 3.

The foregoing three cases are merely examples, and are not intended to limit the technical solutions in embodiments of this application. For example, if the SMF initiates the process of establishing one QoS flow, and the created QoS flow is the first QoS flow, the method described in the third case may alternatively be used. If the SMF initiates the process of establishing one QoS flow, and the created QoS flow is the second QoS flow, the method described in the second case may alternatively be used. This is not limited in this embodiment of this application.

In the foregoing three rule setting processes, the SMF sets a same rule for the correlated QoS flows as much as possible. This can reduce the quantity of set rules. Alternatively, the SMF may use another setting manner. For example, the SMF sets a rule for each QoS flow. In this way, confusion between rules can be reduced, and the rule is clearer. In this setting manner, there may also be a plurality of cases in which the SMF sets the rule for the QoS flow. The following uses examples for description.

1. In a first case, the SMF initiates the process of establishing the plurality of QoS flows, in other words, the SMF creates the plurality of QoS flows. In this embodiment of this application, an example in which the SMF creates two QoS flows is used. If the SMF needs to create more QoS flows, a manner is also similar.

For example, the two created QoS flows initiated by the SMF are the first QoS flow and the second QoS flow. The data packet transmitted by using the first QoS flow corresponds to a first service, and the data packet transmitted by using the second QoS flow corresponds to a second service (both the first service and the second service correspond to the first traffic flow). An importance degree of the first service is higher than that of the second service. In the first case, the SMF may set the first rule corresponding to the first QoS flow, and set the second rule corresponding to the second QoS flow. The first rule indicates the first QoS flow, and the second rule indicates the second QoS flow. Content of a packet filter included in the first rule and content of a packet filter included in the second rule are, for example, the information such as the IP 5-tuple of the first application included in the first request message or the third request message, namely, the packet filter included in the first rule and the packet filter included in the second rule, may be the same.

In this case, each of the first rule and the second rule may indicate the QoS flow by using an original field (for example, each of the first rule and the second rule is a QoS rule, and each of the first rule and the second rule indicates the QoS flow by using a field c), and a field does not need to be newly defined in the rule to indicate the QoS flow. Therefore, a matching relationship between a QoS flow and an importance degree of a traffic flow cannot be implicitly indicated by using the original field and the newly defined field. Therefore, optionally, the SMF may still set the newly defined field in the first rule. For example, the newly defined field is referred to as the field f. In this case, the field f indicates the importance degree of the data packet transmitted by using the QoS flow indicated by the first rule, or indicates the frame type corresponding to the data packet transmitted by using the QoS flow indicated by the first rule (in other words, indicates the service corresponding to the data packet transmitted by using the QoS flow indicated by the first rule). For example, the field f of the first rule indicates the first-type service, and the field f of the second rule indicates the second-type service. The first-type service has a high importance degree, and the second-type service has a low importance degree. An example in which the first application is the XR application is used. For example, the field f of the first rule may indicate the frame corresponding to the first QoS flow, for example, indicate the I frame and/or the P0 frame, or indicate the P1 frame and/or the P2 frame. In this case, the importance degree of the data packet transmitted by using the first QoS flow can be determined by using the field f of the first rule. For the second rule, the SMF may also use a similar setting manner. After receiving a data packet, if determining that the data packet matches the first rule and the second rule, the UE or the UPF can determine, based on an importance degree of the data packet, whether to map the data packet to the first QoS flow or the second QoS flow. The first rule is, for example, the first QoS rule, and the second rule is, for example, the second QoS rule. Alternatively, the first rule is, for example, the first data packet detection rule, and the second rule is, for example, the second data packet detection rule.

In addition, in the embodiment shown in FIG. 3, when matching an IP 5-tuple of a data packet with rules, the UE or the UPF generally performs sequential matching based on precedences of the rules. For example, if an IP 5-tuple of a data packet can match both the first rule and the second rule, the data packet should be mapped to the second QoS flow for transmission based on an importance degree of the data packet. However, for example, if a precedence of the first rule is higher than that of the second rule, the UPF may first determine that the data packet matches the first rule. In this case, it is not determined that the data packet also matches the second rule. In this case, two cases may occur. One case is: Although the importance degree of the data packet does not match the importance degree of the data packet transmitted by using the QoS flow indicated by the first rule, because only the first rule is matched in this case, the UPF still maps the data packet to the first QoS flow for transmission. This may cause data packet transmission disorder. The other case is: Because the importance degree of the data packet does not match the importance degree of the data packet transmitted by using the QoS flow indicated by the first rule, the UPF may consider that a transmission error occurs, and may discard the data packet. This may further cause packet loss. In view of this, optionally, in this embodiment of this application, the precedence of the first rule may be the same as the precedence of the second rule. For example, the SMF sets the same precedence for the first rule and the second rule. In this way, when matching a data packet with a rule, the UPF may obtain the first rule and the second rule through matching, so that the data packet can be mapped to the appropriate QoS flow.

2. In a second case, the SMF initiates the process of establishing one QoS flow, in other words, the SMF creates one QoS flow. For example, the QoS flow is the first QoS flow. The SMF correlates the first QoS flow with the at least one established QoS flow. For example, the SMF may store the correlation relationship between the QFI of the first QoS flow and the QFI of the at least one QoS flow, to correlate the first QoS flow with the at least one QoS flow. For example, the at least one QoS flow is 1. The QoS flow is referred to as, for example, the second QoS flow. For example, the SMF determines the second QoS flow based on the first request message, or the SMF may determine the second QoS flow by itself. For example, the importance degree of the data packet transmitted by using the first QoS flow is higher than that of the data packet transmitted by using the second QoS flow.

In the second case, the SMF may set the first rule corresponding to the first QoS flow. The first rule indicates the first QoS flow, and content of a packet filter included in the first rule is, for example, the information such as the IP 5-tuple of the first application included in the first request message or the third request message. In addition, the first rule may include the newly defined field, for example, the field f. The field f may indicate the importance degree of the data packet transmitted by using the first QoS flow, or the field f may indicate the frame type corresponding to the data packet transmitted by using the first QoS flow (in other words, indicate the service corresponding to the data packet transmitted by using the first QoS flow). For example, the field f indicates a first-type service, and the first-type service is a service of a high importance degree.

In addition, if the second QoS flow is the established QoS flow, the rule corresponding to the second QoS flow may already exist and does not need to be set again. For example, the second QoS flow corresponds to the second rule. In this case, the SMF may further update the second rule. For example, the SMF newly defines the field f in the second rule. The field f in the second rule may indicate the importance degree of the data packet transmitted by using the second QoS flow, or the field f may indicate the frame type corresponding to the data packet transmitted by using the second QoS flow (in other words, indicate the service corresponding to the data packet transmitted by using the second QoS flow). For example, the field f indicates a second-type service, and the second-type service is a traffic flow of a low importance degree. For example, the importance degree of the first-type service is higher than that of the second-type service. Optionally, if the second rule is not originally used to transmit the first application (or the first traffic flow), the second rule may not include the information such as the IP 5-tuple of the first application (or the first traffic flow). In this case, the SMF may add, to a packet filter of the second rule, the information such as the IP 5-tuple of the first application (or the first traffic flow) included in the first request message or the third request message. Alternatively, if the UE or the UPF determines that a data packet matches the first rule, the UE or the UPF can determine the second rule based on a correlation relationship between the first QoS flow and the second QoS flow, and does not need to determine the second rule by matching the IP 5-tuple. Therefore, the SMF may not need to add, to the packet filter of the second rule, the information such as the IP 5-tuple of the first application included in the first request message or the third request message, either, to simplify content of the second rule.

An example in which the first application is an XR application is used. For example, the field f of the first rule may indicate a frame corresponding to the first QoS flow, for example, indicate the I frame and/or the P0 frame, and the field f of the second rule may indicate a frame corresponding to the second QoS flow, for example, indicate the P1 frame and/or the P2 frame. For example, the first rule and the second rule are data packet detection rules. After receiving a data packet, if the data packet matches the first rule and the second rule, the UPF can determine, based on an importance degree of the data packet, whether to map the data packet to the first QoS flow or the second QoS flow.

Optionally, similar to the foregoing reason, the precedences of the first rule and the second rule may be the same.

2. In a third case, the SMF initiates the process of establishing one QoS flow, in other words, the SMF creates one QoS flow. For example, the QoS flow is the second QoS flow. The SMF correlates the second QoS flow with the at least one established QoS flow. For example, the SMF may store the correlation relationship between the QFI of the second QoS flow and the QFI of the at least one QoS flow, to correlate the second QoS flow with the at least one QoS flow. For example, the at least one QoS flow is 1, and the QoS flow is referred to as, for example, the first QoS flow. For example, the SMF determines the first QoS flow based on the first request message, or the SMF may determine the first QoS flow by itself. For example, the importance degree of the data packet transmitted by using the first QoS flow is higher than that of the data packet transmitted by using the second QoS flow.

In the third case, the SMF may set the second rule corresponding to the second QoS flow, and update the first rule corresponding to the first QoS flow. A manner of setting the second rule, a manner of updating the first rule, and the like are similar to those in the foregoing second case, and details are not described again.

Optionally, similar to the foregoing reason, the precedences of the first rule and the second rule may be the same.

In this embodiment of this application, the server does not need to divide the traffic flow of the first application into two traffic flows, but only needs to transmit the first traffic flow. A working mode of the server is slightly changed, so that the working mode of the server can be better compatible with an existing protocol. In addition, data is transmitted between the server and the UPF over the internet, and there is no QoS guarantee for the data transmitted over the internet. If the server divides one traffic flow into a plurality of traffic flows, for example, into two traffic flows, data packets of the two traffic flows are separately transmitted in a routing manner, and it is very likely that a data packet corresponding to a P frame arrives at the UPF earlier than a data packet corresponding to an I frame. In this case, the UPF may first send the data packet corresponding to the P frame, and then send the data packet corresponding to the I frame. A receive end (for example, the UE) outputs the data packet corresponding to the P frame. However, because the data packet corresponding to the I frame has not been received, outputting the data packet corresponding to the P frame is meaningless, which causes output disorder. However, in this embodiment of this application, the server transmits a data packet by using one traffic flow, and the UPF maps the data packet to two QoS flows for transmission. There is QoS guarantee for transmitting the data packet by using the QoS flows. For example, the data packet corresponding to the I frame arrives at the receive end earlier than the data packet corresponding to the P frame. Therefore, the receive end can normally output the data packets in sequence, thereby reducing a probability of the output disorder. In addition, a network on a RAN side may fluctuate greatly, and the server may perceive fluctuation on the RAN side slowly. If the server divides the traffic flow into a plurality of traffic flows for transmission, when the network on the RAN side fluctuates, the server may not adjust an offloading proportion in time (for example, an output proportion of the traffic flow corresponding to the P frame should be reduced as much as possible, or an output amount of the data packet corresponding to the P frame should be reduced, to reduce a packet loss amount). However, the UPF is closer to a RAN, and can sense the network fluctuation on the RAN side more quickly. Therefore, the UPF can adjust the offloading proportion in time to reduce the packet loss amount.

S505: The AMF sends a first message to the UE by using an access network device, and correspondingly, the UE receives the first message. For example, the first message is an N1 message, or may be another message. In FIG. 5, an example in which the first message is the N1 message is used. If S502 is performed, S505 may be performed. The UE sends the first request message in S502, for example, the first request message is the PDU session modification request, and whether to modify the PDU session is specifically determined by the SMF. Therefore, the AMF may indicate, to the UE by using the first message, whether to modify the PDU session.

S506: The SMF sends the determined data packet detection rule to the UPF, and correspondingly, the UPF receives the data packet detection rule from the SMF. For example, the data packet detection rule includes the first data packet detection rule and/or the second data packet detection rule, or a quantity of data packet detection rules is 1. For details, refer to the foregoing descriptions. The SMF may determine the data packet detection rule and/or the QoS rule in S504. If the SMF determines the data packet detection rule, S506 may be performed.

S507: The SMF sends the determined QoS rule to the UE, and correspondingly, the UE receives the QoS rule from the SMF. For example, the QoS rule includes the first QoS rule and/or the second QoS rule, or a quantity of QoS rules is 1. For details, refer to the foregoing descriptions. The SMF may determine the data packet detection rule and/or the QoS rule in S504. If the SMF determines the QoS rule, S507 may be performed.

S501, S502 (or S503), and S505 to S507 are all optional steps. Alternatively, the embodiment shown in FIG. 5 is an optional embodiment. Therefore, all the steps in the embodiment shown in FIG. 5 are optional steps.

This embodiment of this application provides a method for establishing the correlated QoS flows, to ensure that the access network device can preferentially discard a data packet of a low importance degree when the network congestion occurs or the resources are insufficient, thereby reducing impact on a user. In this embodiment of this application, the QoS rule and/or the data packet detection rule corresponding to the correlated QoS flows may be set, so that the correlated QoS flows may be indicated by using the corresponding rule, and the UE or the UPF can map data packets of a same traffic flow to different QoS flows, to implement reliability control on data packets of the same traffic flow of different importance degrees.

Figure 6:
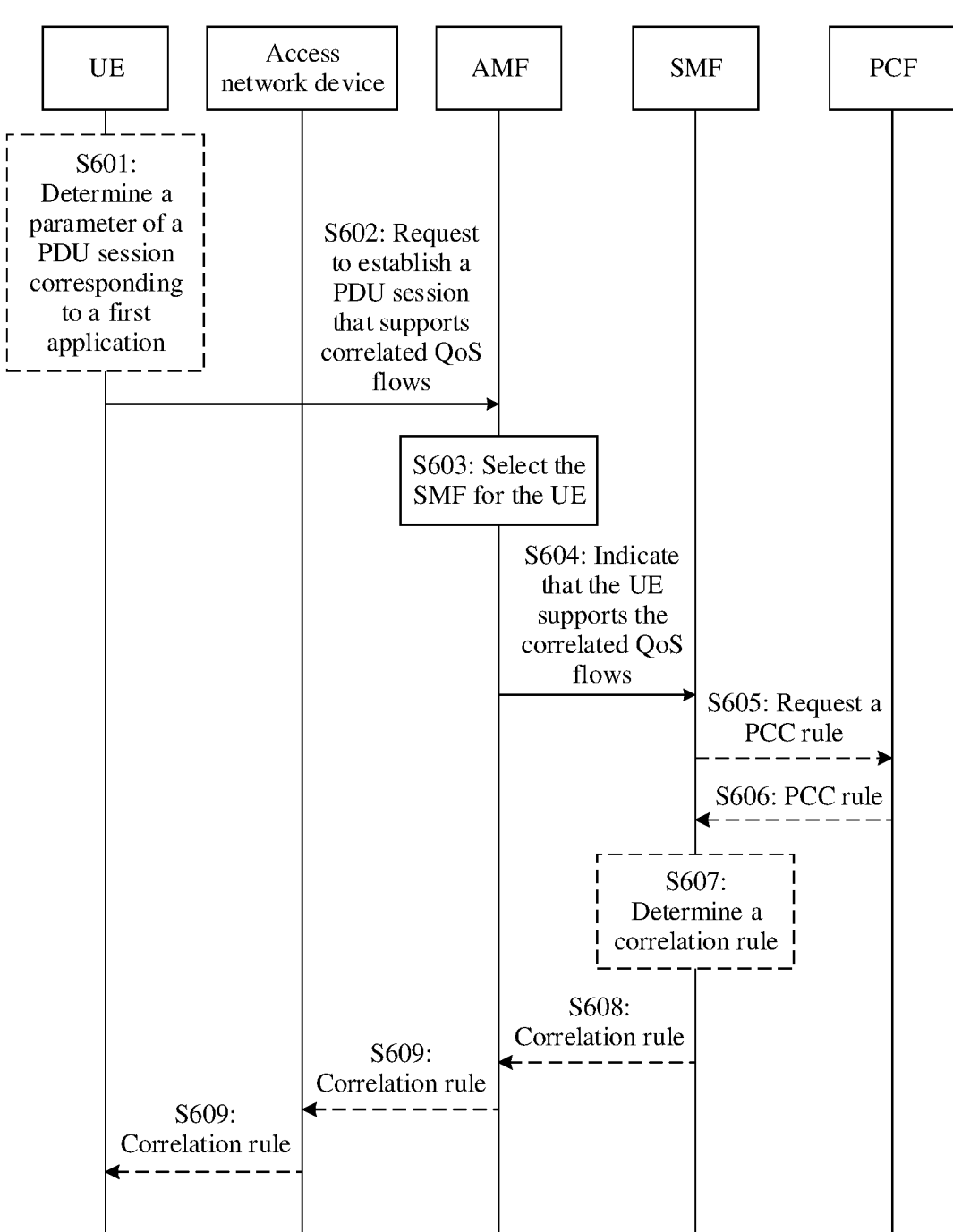
FIG. 6 is a flowchart of a third communication method according to an embodiment of this application.

The correlation rule is mentioned in the embodiment shown in FIG. 5. The following describes a third communication method provided in embodiments of this application. A manner of obtaining the correlation rule is described in the method. FIG. 6 is a flowchart of the method. It may be understood that the correlation rule applied in the foregoing embodiments of this application may be a correlation rule described in the embodiment shown in FIG. 6, or the correlation rule applied in the foregoing embodiments of this application may be a correlation rule generated in another manner. To be specific, the embodiment shown in FIG. 6 may be applied in combination with the embodiment shown in FIG. 3 and/or FIG. 5, or may not be combined with the foregoing embodiment, but independently applied.

S601: UE determines a parameter of a PDU session corresponding to a first application.

For example, the UE stores a UE route selection policy (URSP), and the URSP is, for example, from a PCF or another network element. The URSP includes parameters of PDU sessions corresponding to different applications, and a parameter of a PDU session of one application includes, for example, one or more of the following: a data network name (DNN) of the PDU session, a network slice identifier of the PDU session, or a PDU session type. Therefore, the UE may determine, according to the URSP, the parameter of the PDU session corresponding to the first application.

The URSP may be improved in this embodiment of this application. For example, the URSP may include special type information corresponding to the first application. The special type information may indicate that the PDU session corresponding to the first application is a special type. For example, the special type is a type of transmission by using correlated QoS flows. For example, the special type is represented as a correlated QoS flow (correlated QoS flow, CQF) type. Alternatively, the special type may be represented in another manner, provided that the special type indicates that a data packet of the first application is transmitted by using at least two QoS flows.

S602: The UE sends an uplink non-access stratum (NAS) message to an AMF. Correspondingly, the AMF receives the uplink NAS message from the UE. The uplink NAS message may include request information, and the request information may be used to request to establish a PDU session that supports the correlated QoS flows. For example, the request information is carried by using a request type field of the uplink NAS message. Alternatively, the UE may send the request information to the AMF by using another message.

Optionally, the uplink NAS message may further include a PDU session establishment request message. The PDU session establishment request message includes, for example, indication information 2. The indication information 2 may also be referred to as first indication information. The first indication information may indicate that the UE supports the correlated QoS flows. For example, in addition to indicating that the UE supports the correlated QoS flows, the first indication information may further indicate that the UE supports a selective packet loss capability and/or that the UE supports a semi-persistent scheduling (Semi-Persistent Scheduling, SPS) capability. Selective packet loss refers to a scenario in which an access network device may discard a data packet of a low importance degree, for example, discard a data packet transmitted by using a second QoS flow when the access network device cannot send a data packet in time, for example, when network congestion occurs. Semi-persistent scheduling means that after the access network device receives a resource application request of the UE, the access network device periodically allocates resources to the UE within a period of time. Therefore, a quantity of times that the UE requests resources can be reduced, and a service processing delay can be reduced.

S603: The AMF selects an SMF for the UE based on the request information. The selected SMF supports the correlated QoS flows.

If the request information included in the uplink NAS message is used to request to establish the PDU session that supports the correlated QoS flows, the AMF needs to select the SMF that can support the correlated QoS flows for the UE. For example, the AMF may select, from SMFs that can be selected, the SMF that can support the correlated QoS flows. If a plurality of SMFs can all support the correlated QoS flows, the AMF may select an SMF with lightest load from the SMFs, or may randomly select an SMF from the SMFs. A selection manner is not limited.

S604: The AMF sends the PDU session establishment request message to the SMF. Correspondingly, the SMF receives the PDU session establishment request message from the AMF. The PDU session establishment request message may be included in the uplink NAS message in S602. The AMF sends, to the SMF, the PDU session establishment request message included in the uplink NAS message. The SMF is the SMF selected by the AMF in S603.

S605: The SMF sends a second request message to the PCF, and correspondingly, the PCF receives the second request message from the SMF. The second request message may be used to request a policy and charging control (PCC) rule of the UE.

If the PDU session establishment request message includes the first indication information, optionally, the second request message includes indication information 3.

The indication information 3 may also be referred to as second indication information, and the second indication information may indicate to establish the PDU session that supports the correlated QoS flows.

S606: The PCF sends the PCC rule to the SMF, and correspondingly, the SMF receives the PCC rule from the PCF.

After receiving the second request message, the PCF may determine, based on operator policy information and/or subscription information of the UE, whether the UE is allowed to use the PDU session that supports the correlated QoS flows.

If the second request message includes the second indication information, optionally, the PCC rule may include indication information 5. The indication information 5 may also be referred to as third indication information. The third indication information may indicate that establishment of the PDU session that supports the correlated QoS flows is allowed, or indicate that establishment of the PDU session that supports the correlated QoS flows is not allowed. Alternatively, if the PCC rule includes the third indication information, it indicates that establishment of the PDU session that supports the correlated QoS flows is allowed; or if the PCC rule does not include the third indication information, it indicates that establishment of the PDU session that supports the correlated QoS flows is not allowed. Alternatively, if the PCF sends the PCC rule to the SMF, it indicates that establishment of the PDU session that supports the correlated QoS flows is allowed; or if the PCF does not send the PCC rule to the SMF, it indicates that establishment of the PDU session that supports the correlated QoS flows is not allowed.

If the PCC rule indicates that establishment of the PDU session that supports the correlated QoS flows is allowed, optionally, the PCC rule may further indicate information about the PDU session, for example, indicate a quantity of QoS flows that need to be created in the correlated QoS flows, for example, the quantity is 1 or 2.

S607: The SMF determines a correlation rule. For example, the SMF may generate the correlation rule according to the PCC rule. For descriptions of the correlation rule, refer to the embodiment shown in FIG. 5.

S608: The SMF sends the correlation rule to the AMF. Correspondingly, the AMF receives the correlation rule from the SMF.

For example, the SMF sends a PDU session accept (PDU session accept) message to the AMF. For example, the PDU session accept message is referred to as a first PDU session accept message, and the first PDU session accept message may include the correlation rule. Optionally, the SMF may further send a PDU session accept indication to the AMF. The PDU session accept indication indicates, for example, that the PDU session that supports the correlated QoS flows has been established. The AMF may mark the PDU session as a CQF PDU session (it may be understood that the AMF records the PDU session as the session that supports the correlated QoS flows). In other words, the AMF may determine that the PDU session supports the correlated QoS flows.

S609: The AMF sends the correlation rule to the UE. Correspondingly, the UE receives the correlation rule from the AMF.

For example, the AMF may send a PDU session accept message to the UE. For example, the PDU session accept message is referred to as a second PDU session accept message, and the second PDU session accept message may include the correlation rule. For example, the AMF may include the second PDU session accept message in an N2 message, and the AMF may send the N2 message to the access network device. After receiving the N2 message, the access network device may send an access network message (AN message) to the UE. The access network message may include the second PDU session accept message. Alternatively, the SMF may send the correlation rule to the UE.

S601 and S605 to S609 are optional steps. Alternatively, the embodiment shown in FIG. 6 is an optional embodiment. Therefore, all the steps included in the embodiment shown in FIG. 6 are optional steps.

According to the process provided in this embodiment of this application, the PDU session corresponding to the first application is established, and the PDU session can support the correlated QoS flows, so that a service of the first application can be transmitted. In addition, the UE also obtains the correlation rule, so that the UE may request the SMF to establish the correlated QoS flows.

For example, the first application is an XR application. If a user starts the XR application through an XR client, a session (for example, a protocol data unit (protocol data unit, PDU) session) is established between the XR client (namely, the UE) and a server, to establish corresponding QoS flows (for example, a first QoS flow and the second QoS flow), so as to start transmitting data packets, so that the user may watch an XR video. The server needs to transmit only one traffic flow, and the traffic flow is transmitted by using the first QoS flow and the second QoS flow. For example, an importance degree of a data packet transmitted by using the first QoS flow is higher than that of a data packet transmitted by using the second QoS flow. In a process of watching a video, network quality may deteriorate. For example, network congestion occurs. Because data packets of a same traffic flow are transmitted by using the two QoS flows, the access network device may discard, as much as possible, the data packet transmitted by using the second QoS flow, to reduce impact of packet loss on a receive end. In this case, even if network quality deteriorates, the XR client may still be able to receive the data packet transmitted by using the first QoS flow. For the user, poor picture quality may occur, for example, a picture is not clear enough. However, the user can still watch the picture, and a case such as discontinuous picture or frame freezing does not occur. After the network is recovered, both the first QoS flow and the second QoS flow can be used to normally transmit the data packets, so that picture quality is improved, and user experience is better. It can be learned that, according to the technical solution in this embodiment of this application, when network quality deteriorates, image effect may not be good enough. However, it can be ensured that the user can implement continuous watching as much as possible, and occurrence of a case such as frame freezing is reduced.

Based on the foregoing method embodiments, communication apparatuses provided in embodiments of this application are described.

An embodiment of this application provides a communication apparatus. The communication apparatus includes, for example, a processing unit and a transceiver unit (or referred to as a communication unit). The processing unit may be configured to implement a processing function of the UE in any one of the embodiment shown in FIG. 3, the embodiment shown in FIG. 5, or the embodiment shown in FIG. 6. The transceiver unit may be configured to implement all or some of transceiver functions of the UE in any one of the embodiment shown in FIG. 3, the embodiment shown in FIG. 5, or the embodiment shown in FIG. 6. Alternatively, the processing unit may be configured to implement a processing function implemented by the network device in any one of the embodiment shown in FIG. 3, the embodiment shown in FIG. 5, or the embodiment shown in FIG. 6. The transceiver unit may be configured to implement all or some sending and receiving functions of the network device in any one of the embodiment shown in FIG. 3, the embodiment shown in FIG. 5, or the embodiment shown in FIG. 6. The network device is, for example, an AMF, a UPF, or an SMF.

Optionally, the processing unit and/or the transceiver unit may be implemented by using virtual modules/a virtual module. For example, the processing unit may be implemented by using a software functional unit or a virtual apparatus, and the transceiver unit may be implemented by using a software functional unit or a virtual apparatus. Alternatively, the processing unit and/or the transceiver unit may be implemented by using physical apparatuses/a physical apparatus (for example, a circuit system and/or a processor). A case in which the processing unit and the transceiver unit are implemented by using the physical apparatuses is described below.

An embodiment of this application provides a terminal device. The terminal device (for ease of description, referred to as UE) may be used in the foregoing embodiments. The terminal device includes a corresponding means (means), unit, and/or circuit used to implement a function of the terminal device in any one of the embodiment shown in FIG. 3, the embodiment shown in FIG. 5, or the embodiment shown in FIG. 6. For example, the terminal device includes a transceiver module configured to support the terminal device in implementing a transceiver function, and a processing module configured to support the terminal device in processing a signal.

Figure 7:
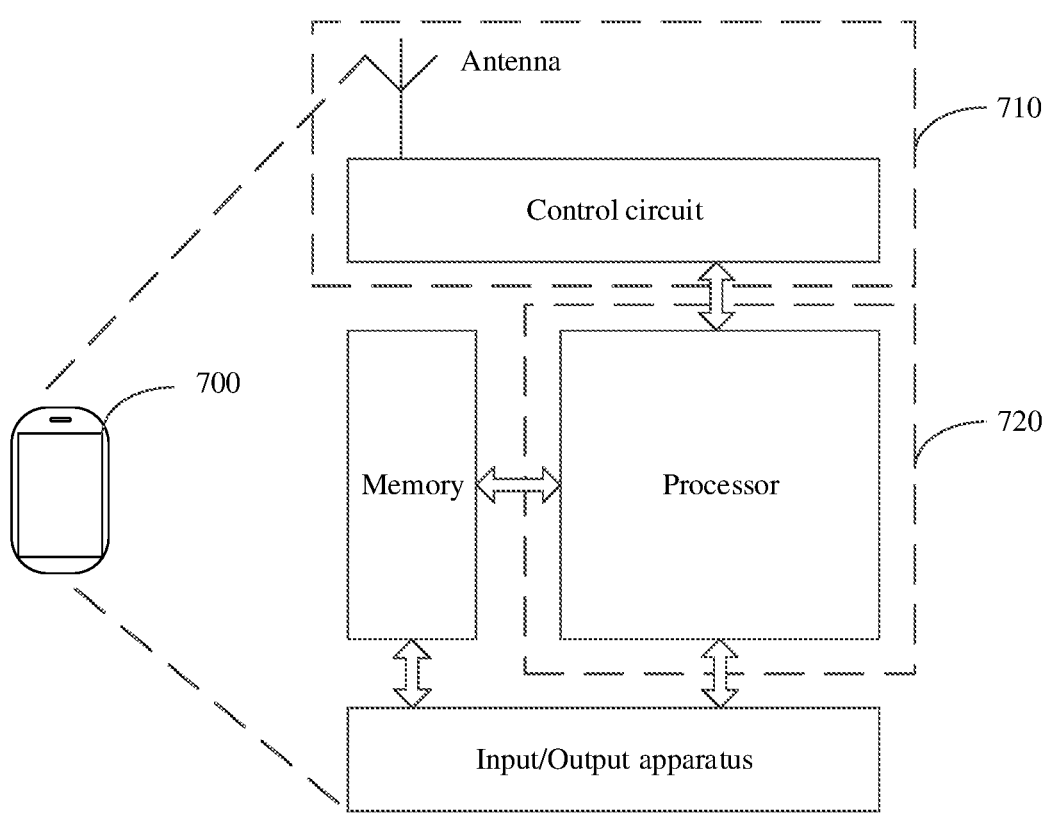
FIG. 7 is a schematic block diagram of a terminal device according to an embodiment of this application.

FIG. 7 is a schematic diagram of a structure of a terminal device according to an embodiment of this application.

A terminal device 700 may be applicable to the architecture shown in FIG. 2. For ease of description, FIG. 7 shows only main components of the terminal device 700. As shown in FIG. 7, the terminal device 700 includes a processor, a memory, a control circuit, an antenna, and an input/output apparatus. The processor is mainly configured to: process a communication protocol and communication data, control the entire terminal device 700, execute a software program, and process data of the software program. The memory is mainly configured to store the software program and the data. The control circuit is mainly configured to convert a baseband signal and a radio frequency signal and process the radio frequency signal. The antenna is mainly configured to receive and transmit radio frequency signals in a form of an electromagnetic wave. The input/output apparatus such as a touchscreen, a display screen, a microphone, or a keyboard is mainly configured to receive data input by a user and output data to the user.

An example in which the terminal device 700 is a mobile phone is used. After the terminal device 700 is powered on, the processor may read a software program in a storage unit, interpret and execute instructions of the software program, and process data of the software program. When data needs to be sent wirelessly, after performing baseband processing on the to-be-sent data, the processor outputs a baseband signal to the control circuit. The control circuit performs radio frequency processing on the baseband signal, and then sends a radio frequency signal to the outside through the antenna in a form of an electromagnetic wave. When data is sent to the terminal device 700, the control circuit receives a radio frequency signal through the antenna, converts the radio frequency signal into a baseband signal, and outputs the baseband signal to the processor. The processor converts the baseband signal into data and processes the data.

A person skilled in the art may understand that, for ease of description, FIG. 7 shows only one memory and one processor. In some embodiments, the terminal device 700 may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data. The central processing unit is mainly configured to control the entire terminal device 700, execute the software program, and process the data of the software program. The processor in FIG. 7 integrates functions of the baseband processor and the central processing unit. A person skilled in the art may understand that the baseband processor and the central processing unit may alternatively be independent processors, and are interconnected by using a technology such as a bus. The terminal device 700 may include a plurality of baseband processors to adapt to different network standards. The terminal device 700 may include a plurality of central processing units to enhance a processing capability of the terminal device. Components of the terminal device 700 may be connected by using various buses. The baseband processor may also be represented as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program, and the processor executes the software program to implement a baseband processing function.

In an example, the antenna and the control circuit that have a transceiver function may be considered as a transceiver unit 710 of the terminal device 700, and the processor that has a processing function may be considered as a processing unit 720 of the terminal device 700. As shown in FIG. 7, the terminal device 700 includes the transceiver unit 710 and the processing unit 720. The transceiver unit may also be referred to as a transceiver, a transceiver machine, a transceiver apparatus, or the like. Optionally, a component configured to implement a receiving function in the transceiver unit 710 may be considered as a receiving unit, and a component configured to implement a sending function in the transceiver unit 710 may be considered as a sending unit. In other words, the transceiver unit 710 includes the receiving unit and the sending unit. For example, the receiving unit may also be referred to as a receiver machine, a receiver, a receiving circuit, or the like, and the sending unit may be referred to as a transmitter machine, a transmitter, a transmitting circuit, or the like.

Figure 8:
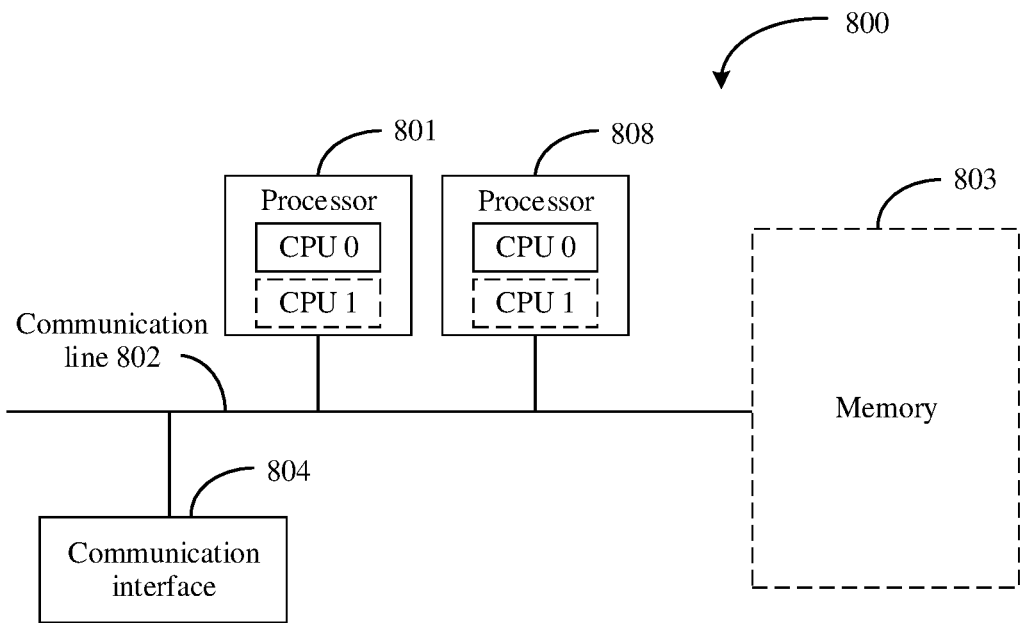
FIG. 8 is a schematic block diagram of a communication apparatus according to an embodiment of this application.

FIG. 8 is a schematic diagram of an apparatus according to this application. An apparatus 800 may be a network device, or a circuit system (for example, a chip system) disposed in the network device. The network device may be used in the foregoing embodiments. The network device includes a means (means), a unit, and/or a circuit configured to implement, for example, a function of the network device in any one of the embodiment shown in FIG. 3, the embodiment shown in FIG. 5, or the embodiment shown in FIG. 6. For example, the network device includes a transceiver module configured to support the network device in implementing a transceiver function, and a processing module configured to support the network device in processing a signal. The network device is, for example, the AMF, the SMF, or the UPF in the foregoing embodiments.

The apparatus 800 includes at least one processor 801, a communication line 802, and at least one communication interface 804. In an optional implementation, the apparatus 800 may further include a memory 803. Because the memory 803 is not a functional module that needs be included, but is only a functional module that can be optionally included, the memory 803 is represented by using a dotted box in FIG. 8.

The processor 801 may include a general-purpose central processing unit (CPU), a microprocessor, an application-specific integrated circuit (ASIC), or one or more integrated circuits configured to control program execution of the solutions in this application.

The communication line 802 may include a path for transferring information between the components described above.

The communication interface 804 uses any apparatus such as a transceiver, and is configured to communicate with another device or a communication network, for example, the Ethernet, a radio access network (RAN), a wireless local area network (WLAN), or a wired access network.

The memory 803 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disk storage, an optical disk storage (including a compact disc, a laser disc, an optical disc, a digital versatile disc, a Blu-ray disc, and the like), a magnetic disk storage medium or another magnetic storage device, or any other medium that can be used to carry or store desired program code in a form of an instruction or a data structure and that can be accessed by a computer, but is not limited thereto. The memory 803 may exist independently, and is connected to the processor 801 through the communication line 802. Alternatively, the memory 803 and the processor 801 may be integrated together.

The memory 803 is configured to store computer-executable instructions for executing the solution of this application, and the processor 801 controls execution. The processor 801 is configured to execute the computer-executable instructions stored in the memory 803, to implement the communication method provided in the foregoing embodiments of this application.

Optionally, the computer-executable instructions in this embodiment of this application may also be referred to as application program code. This is not specifically limited in this embodiment of this application.

In specific implementation, in an embodiment, the processor 801 may include one or more CPUs, for example, a CPU 0 and a CPU 1 in FIG. 8.

In specific implementation, in an embodiment, the apparatus 800 may include a plurality of processors, for example, the processor 801 and a processor 808 in FIG. 8. Each of the processors may be a single-core (single-CPU) processor, or may be a multi-core (multi-CPU) processor. The processor herein may be one or more devices, circuits, and/or processing cores configured to process data (for example, computer program instructions).

When the apparatus shown in FIG. 8 is a chip, for example, a chip of a policy control function network element, a chip of a session management function network element, a chip of a mobility management function network element, a chip of an access network element, or a chip of a terminal device, the chip includes the processor 801 (which may further include the processor 808), the communication line 802, the memory 803, and the communication interface 804. Specifically, the communication interface 804 may be an input interface, a pin, a circuit, or the like. The memory 803 may be a register, a cache, or the like. The processor 801 and the processor 808 each may be a general-purpose CPU, a microprocessor, an ASIC, or one or more integrated circuits configured to control program execution of the communication method in any one of the foregoing embodiments.

A person of ordinary skill in the art may be aware that, in combination with the examples described in embodiments disclosed in this specification, units and methods can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in another manner. For example, the described apparatus embodiment is merely an example. For example, division into the units is merely logical function division. The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for enabling a computer device (which may be a personal computer, a server, or a network device) to perform all or some of the steps of the methods described in embodiments of this application. The foregoing computer-readable storage medium may be any usable medium that can be accessed by a computer. For example, the computer-readable storage medium may include but is not limited to: a random access memory (RAM), a read-only memory (ROM), a programmable read-only memory (PROM), an erasable programmable read-only memory (EPROM), an electrically erasable programmable read-only memory (EEPROM), a compact disc read-only memory (CD-ROM), a universal serial bus flash disk (universal serial bus flash disk), a removable hard disk, another optical disc memory, a magnetic disk storage medium or another magnetic storage device, or any other medium that can be used to carry or store expected program code in a form of instructions or a data structure and that can be accessed by a computer. By way of example but not limitative description, many forms of RAMs may be used, for example, a static random access memory (SRAM), a dynamic random access memory (dynamic RAM, DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), or a direct rambus random access memory (DR RAM).

Embodiment 1: A communication method includes: receiving a first traffic flow; and sending the first traffic flow by using at least two QoS flows.

Embodiment 2: According to the method according to Embodiment 1, the first traffic flow corresponds to a first data packet; the receiving a first traffic flow includes: receiving the first data packet; and the sending the first traffic flow by using at least two QoS flows includes: determining a first rule corresponding to the first data packet, where the first rule is a QoS rule or a data packet detection rule; and mapping the first data packet to a QoS flow that is indicated by the first rule and that matches an importance degree of the first data packet for sending, where the QoS flow is one of the at least two QoS flows.

Embodiment 3: According to the method according to Embodiment 1 or Embodiment 2, the at least two QoS flows include a first QoS flow and a second QoS flow, and an importance degree of a data packet transmitted by using the first QoS flow is higher than that of a data packet transmitted by using the second QoS flow.

Embodiment 4: According to the method according to Embodiment 3, the first rule indicates the first QoS flow and the second QoS flow, and the importance degree of the data packet transmitted by using the first QoS flow is higher than that of the data packet transmitted by using the second QoS flow.

Embodiment 5: According to the method according to Embodiment 4, a first field of the first rule indicates the first QoS flow, and a second field of the first rule indicates the second QoS flow.

Embodiment 6: According to the method according to Embodiment 2, when the first rule is the QoS rule, the QoS rule includes a first QoS rule and a second QoS rule, where the first QoS rule indicates a first QoS flow in the at least two QoS flows, and the second QoS rule indicates a second QoS flow in the at least two QoS flows; or when the first rule is the data packet detection rule, the data packet detection rule includes a first data packet detection rule and a second data packet detection rule, where the first data packet detection rule indicates a first QoS flow in the at least two QoS flows, and the second data packet detection rule indicates a second QoS flow in the at least two QoS flows.

Embodiment 7: According to the method according to Embodiment 6, when the first rule is the QoS rule, a precedence of the first QoS rule is the same as a precedence of the second QoS rule; or when the first rule is the data packet detection rule, a precedence of the first data packet detection rule is the same as a precedence of the second data packet detection rule.

Embodiment 8: According to the method according to any one of Embodiments 2 to 7, the method further includes: receiving the first rule.

Embodiment 9: According to the method according to any one of Embodiments 1 to 8, the method further includes: sending a first request message to an SMF, where the first request message is used to request to determine correlated QoS flows, and the correlated QoS flows are used to transmit a traffic flow corresponding to an application.

Embodiment 10: According to the method according to Embodiment 9, the first request message further indicates a quantity of created QoS flows; and the created QoS flow and at least one established QoS flow are the correlated QoS flows, or the created QoS flows are the correlated QoS flows.

Embodiment 11: According to the method according to Embodiment 9 or 10, the method further includes: receiving a correlation rule, where the correlation rule indicates information about the traffic flow that allows establishment of the correlated QoS flows.

Embodiment 12: According to the method according to Embodiment 11, the information about the traffic flow includes one or more of the following: an IP address, an identifier of a network slice, a transmission bandwidth, a delay requirement, a media coding format, a media type, or a service type.

Embodiment 13: According to the method according to any one of Embodiments 1 to 12, the method further includes: sending first indication information, where the first indication information indicates that a terminal device supports the correlated QoS flows.

Embodiment 14: According to the method according to Embodiment 13, the first indication information is included in a session establishment request message, and the session establishment request message is included in an uplink NAS message.

Embodiment 15: According to the method according to Embodiment 13 or 14, the first indication information further indicates that the terminal device supports selective packet loss and/or that the terminal device supports semi-persistent scheduling.

Embodiment 16: According to the method according to Embodiment 14, the uplink NAS message further includes request information, and the request information is used to request to establish a session that supports the correlated QoS flows.

Embodiment 17: According to the method according to any one of Embodiments 13 to 16, the method further includes: determining the first indication information according to a URSP, where the URSP indicates that a session type of the application is supporting the correlated QoS flows.

Embodiment 18: A communication method includes: receiving a first request message, where the first request message is used to request to determine correlated QoS flows, and the correlated QoS flows are used to transmit a traffic flow corresponding to an application; and creating a QoS flow based on the first request message, where the created QoS flow and at least one established QoS flow are the correlated QoS flows, or created QoS flows are the correlated QoS flows.

Embodiment 19: According to the method according to Embodiment 18, the first request message further indicates a quantity of created QoS flows.

Embodiment 20: According to the method according to Embodiment 18 or 19, the first request message further includes description information of the created QoS flow; or the first request message further includes description information of the created QoS flow, and includes an identifier of the at least one QoS flow.

Embodiment 21: According to the method according to Embodiment 20, the description information of the created QoS flow includes one or more of the following: a 5QI of the created QoS flow, a GFBR of the created QoS flow, an MFBR of the created QoS flow, or an averaging window of the created QoS flow.

Embodiment 22: According to the method according to any one of Embodiments 18 to 21, when the quantity of created QoS flows is greater than 1, the method further includes: setting a first rule corresponding to a first QoS flow, and skipping setting a corresponding rule for a second QoS flow, where a first field of the first rule indicates the first QoS flow and a second field of the first rule indicates the second QoS flow, the first QoS flow and the second QoS flow belong to the created QoS flows, an importance degree of a data packet transmitted by using the first QoS flow is higher than that of a data packet transmitted by using the second QoS flow, and the first rule is a QoS rule or a data packet detection rule.

Embodiment 23: According to the method according to any one of Embodiments 18 to 21, when the quantity of created QoS flows is 1, the method further includes: setting a first rule corresponding to a first QoS flow, and deleting QoS mapping information corresponding to the application from a second rule, where the first QoS flow is the created QoS flow, the second rule corresponds to a second QoS flow, the second QoS flow belongs to the at least one QoS flow, and an importance degree of a data packet transmitted by using the first QoS flow is higher than that of a data packet transmitted by using the second QoS flow; and the first rule is a first QoS rule, and the second rule is a first QoS rule; or the first rule is a first data packet detection rule, and the second rule is a second data packet detection rule.

Embodiment 24: According to the method according to Embodiment 23, the method further includes: storing a correlation relationship between the first QoS flow and the second QoS flow, to correlate the first QoS flow with the second QoS flow.

Embodiment 25: According to the method according to any one of Embodiments 18 to 21, when the quantity of created QoS flows is 1, the method further includes: skipping setting a corresponding rule for a second QoS flow, and updating a first rule corresponding to a first QoS flow, where an updated first rule includes a second field, the second field indicates the second QoS flow, the second QoS flow is the created QoS flow, the first QoS flow belongs to the at least one QoS flow, an importance degree of a data packet transmitted by using the first QoS flow is higher than that of a data packet transmitted by using the second QoS flow, and the first rule is a QoS rule or a data packet detection rule.

Embodiment 26: According to the method according to any one of Embodiments 18 to 21, when the quantity of created QoS flows is greater than 1, the method further includes: setting a first rule corresponding to a first QoS flow and a second rule corresponding to a second QoS flow, where the first rule indicates a first-type service, and the second rule indicates a second-type service; an importance degree of the first-type service is higher than that of the second-type service; and the first rule is a first QoS rule, and the second rule is a first QoS rule; or the first rule is a first data packet detection rule, and the second rule is a second data packet detection rule.

Embodiment 27: According to the method according to any one of Embodiments 18 to 21, when the quantity of created QoS flows is 1, the method further includes: setting a first rule corresponding to a first QoS flow, and updating a second rule corresponding to a second QoS flow, where the first rule indicates a first-type service, an updated second rule indicates a second-type service, the first QoS flow is the created QoS flow, and the second QoS flow belongs to the at least one QoS flow; or setting a second rule corresponding to a second QoS flow, and updating a first rule corresponding to a first QoS flow, where an updated first rule indicates a first-type service, the second rule indicates a second-type service, the second QoS flow is the created QoS flow, and the first QoS flow belongs to the at least one QoS flow, where the first rule is a first QoS rule, and the second rule is a first QoS rule; or the first rule is a first data packet detection rule, and the second rule is a second data packet detection rule; and an importance degree of the first-type service is higher than that of the second-type service.

Embodiment 28: According to the method according to Embodiment 27, a precedence of the first rule is the same as a precedence of the second rule.

Embodiment 29: According to the method according to any one of Embodiments 18 to 28, the method further includes: sending a second request message to a PCF, where the second request message is used to request a PCC rule of a terminal device, the second request message further includes second indication information, the second indication information indicates to establish a session that supports the correlated QoS flows, and the correlated QoS flows are used to transmit the traffic flow corresponding to the application; and receiving the PCC rule from the PCF, where the PCC rule indicates whether establishment of the session that supports the correlated QoS flows is allowed.

Embodiment 30: According to the method according to Embodiment 29, when the PCC rule indicates that establishment of the session that supports the correlated QoS flows is allowed, the PCC rule further indicates a quantity of QoS flows that are allowed to be established.

Embodiment 31: According to the method according to Embodiment 29 or 30, the method further includes: determining a correlation rule, where the correlation rule indicates information about the traffic flow that allows establishment of the correlated QoS flows.

Embodiment 32: According to the method according to Embodiment 31, the information about the traffic flow includes one or more of the following: the IP address, the identifier of the network slice, the transmission bandwidth, the delay requirement, the media coding format, the media type, or the service type.

Embodiment 33: According to the method according to Embodiment 31 or 32, the method further includes: sending the correlation rule to an AMF; and/or sending the correlation rule to the terminal device.

Embodiment 34: According to the method according to any one of Embodiments 29 to 33, the method further includes: receiving a session establishment request message from the AMF, where the session establishment request message includes first indication information, and the first indication information indicates that the terminal device supports the correlated QoS flows.

Embodiment 35: A communication method includes: receiving request information from a terminal device, where the request information is used to request to establish a session that supports correlated QoS flows; and selecting an SMF for the terminal device based on the request information, where the SMF supports the correlated QoS flows.

Embodiment 36: According to the method according to Embodiment 35, the request information is carried in an uplink NAS message.

Embodiment 37: According to the method according to Embodiment 36, the uplink NAS message further includes a session establishment request message, the session establishment request message includes first indication information, and the first indication information indicates that the terminal device supports the correlated QoS flows.

Embodiment 38: According to the method according to Embodiment 37, the first indication information further indicates that the terminal device supports selective packet loss and/or that the terminal device supports semi-persistent scheduling.

Embodiment 39: According to the method according to Embodiment 37 or 38, the method further includes: sending the session establishment request message to the SMF.

Embodiment 40: According to the method according to Embodiment 39, the method further includes: receiving a session accept indication from the SMF, where the session accept indication indicates that a session that supports the correlated QoS flows has been established; and recording the session as the session that supports the correlated QoS flows.

Embodiment 41: According to the method according to Embodiment 39 or 40, the method further includes: receiving a correlation rule from the SMF, where the correlation rule indicates information about a traffic flow that allows establishment of the correlated QoS flows.

Embodiment 42: According to the method according to Embodiment 41, the information about the traffic flow includes one or more of the following: an IP address, an identifier of a network slice, a transmission bandwidth, a delay requirement, a media coding format, a media type, or a service type.

Embodiment 43: According to the method according to Embodiment 41 or 42, the method further includes: sending the correlation rule to the terminal device.

Embodiment 44: According to the method according to Embodiment 41 or 42, the method further includes: receiving a first request message from the terminal device, where the first request message is used to request to determine the correlated QoS flows, and the correlated QoS flows are used to transmit the traffic flow corresponding to an application; and sending the first request message to the SMF.

Embodiment 45: According to the method according to Embodiment 44, the first request message further indicates a quantity of created QoS flows; and the created QoS flow and at least one established QoS flow are the correlated QoS flows, or the created QoS flows are the correlated QoS flows.

Embodiment 46: A communication apparatus includes: a processing unit, configured to receive a first traffic flow through a receiving unit, where the processing unit is further configured to send the first traffic flow through a sending unit and by using at least two QoS flows.

Embodiment 47: According to the communication apparatus according to Embodiment 46, the first traffic flow corresponds to a first data packet; the processing unit is configured to receive the first traffic flow through the receiving unit in the following manner: receiving the first data packet through the receiving unit; and the processing unit is configured to send the first traffic flow through the sending unit and by using the at least two QoS flows in the following manner: determining a first rule corresponding to the first data packet, where the first rule is a QoS rule or a data packet detection rule; and mapping the first data packet to a QoS flow that is indicated by the first rule and that matches an importance degree of the first data packet, to send the first data packet through the sending unit, where the QoS flow is one of the at least two QoS flows.

Embodiment 48: According to the communication apparatus according to Embodiment 46 or Embodiment 47, the at least two QoS flows include a first QoS flow and a second QoS flow, and an importance degree of a data packet transmitted by using the first QoS flow is higher than that of a data packet transmitted by using the second QoS flow.

Embodiment 49: According to the communication apparatus according to Embodiment 48, the first rule indicates the first QoS flow and the second QoS flow, and the importance degree of the data packet transmitted by using the first QoS flow is higher than that of the data packet transmitted by using the second QoS flow.

Embodiment 50: According to the communication apparatus according to Embodiment 49, a first field of the first rule indicates the first QoS flow, and a second field of the first rule indicates the second QoS flow.

Embodiment 51: According to the communication apparatus according to Embodiment 47, when the first rule is the QoS rule, the QoS rule includes a first QoS rule and a second QoS rule, where the first QoS rule indicates a first QoS flow in the at least two QoS flows, and the second QoS rule indicates a second QoS flow in the at least two QoS flows; or when the first rule is the data packet detection rule, the data packet detection rule includes a first data packet detection rule and a second data packet detection rule, where the first data packet detection rule indicates a first QoS flow in the at least two QoS flows, and the second data packet detection rule indicates a second QoS flow in the at least two QoS flows.

Embodiment 52: According to the communication apparatus according to Embodiment 51, when the first rule is the QoS rule, a precedence of the first QoS rule is the same as a precedence of the second QoS rule; or when the first rule is the data packet detection rule, a precedence of the first data packet detection rule is the same as a precedence of the second data packet detection rule.

Embodiment 53: According to the communication apparatus according to any one of Embodiments 47 to 52, the processing unit is further configured to receive the first rule through the receiving unit.

Embodiment 54: According to the communication apparatus according to any one of Embodiments 46 to 53, the processing unit is further configured to send a first request message to an SMF through the sending unit, where the first request message is used to request to determine correlated QoS flows, and the correlated QoS flows are used to transmit a traffic flow corresponding to an application.

Embodiment 55: According to the communication apparatus according to Embodiment 54, the first request message further indicates a quantity of created QoS flows; and the created QoS flow and at least one established QoS flow are the correlated QoS flows, or the created QoS flows are the correlated QoS flows.

Embodiment 56: According to the communication apparatus according to Embodiment 54 or 55, the processing unit is further configured to receive a correlation rule through the receiving unit, where the correlation rule indicates information about the traffic flow that allows establishment of the correlated QoS flows.

Embodiment 57: According to the communication apparatus according to Embodiment 56, the information about the traffic flow includes one or more of the following: an IP address, an identifier of a network slice, a transmission bandwidth, a delay requirement, a media coding format, a media type, or a service type.

Embodiment 58: According to the communication apparatus according to any one of Embodiments 46 to 57, the processing unit is further configured to send first indication information through the sending unit, where the first indication information indicates that a terminal device supports the correlated QoS flows.

Embodiment 59: According to the communication apparatus according to Embodiment 58, the first indication information is included in a session establishment request message, and the session establishment request message is included in an uplink NAS message.

Embodiment 60: According to the communication apparatus according to Embodiment 58 or 59, the first indication information further indicates that the terminal device supports selective packet loss and/or that the terminal device supports semi-persistent scheduling.

Embodiment 61: According to the communication apparatus according to Embodiment 59, the uplink NAS message further includes request information, and the request information is used to request to establish a session that supports the correlated QoS flows.

Embodiment 62: According to the communication apparatus according to any one of Embodiments 58 to 61, the processing unit is further configured to determine the first indication information according to a URSP, where the URSP indicates that a session type of the application is supporting the correlated QoS flows.

Embodiment 63: A communication apparatus includes: a receiving unit, configured to receive a first request message, where the first request message is used to request to determine correlated QoS flows, and the correlated QoS flows are used to transmit a traffic flow corresponding to an application (or a processing unit, configured to receive a first request message through a receiving unit, where the first request message is used to request to determine correlated QoS flows, and the correlated QoS flows are used to transmit a traffic flow corresponding to an application), where the processing unit is configured to create a QoS flow based on the first request message, where the created QoS flow and at least one established QoS flow are the correlated QoS flows, or created QoS flows are the correlated QoS flows.

Embodiment 64: According to the communication apparatus according to Embodiment 63, the first request message further indicates a quantity of created QoS flows.

Embodiment 65: According to the communication apparatus according to Embodiment 63 or 64, the first request message further includes description information of the created QoS flow; or the first request message further includes description information of the created QoS flow, and includes an identifier of the at least one QoS flow.

Embodiment 66: According to the communication apparatus according to Embodiment 65, the description information of the created QoS flow includes one or more of the following: a 5QI of the created QoS flow, a GFBR of the created QoS flow, an MFBR of the created QoS flow, or an averaging window of the created QoS flow.

Embodiment 67: According to the communication apparatus according to any one of Embodiments 63 to 66, when the quantity of created QoS flows is greater than 1, the processing unit is further configured to: set a first rule corresponding to a first QoS flow, and skip setting a corresponding rule for a second QoS flow, where a first field of the first rule indicates the first QoS flow and a second field of the first rule indicates the second QoS flow, the first QoS flow and the second QoS flow belong to the created QoS flows, an importance degree of a data packet transmitted by using the first QoS flow is higher than that of a data packet transmitted by using the second QoS flow, and the first rule is a QoS rule or a data packet detection rule.

Embodiment 68: According to the communication apparatus according to any one of Embodiments 63 to 66, when the quantity of created QoS flows is 1, the processing unit is further configured to: set a first rule corresponding to a first QoS flow, and delete QoS mapping information corresponding to the application from a second rule, where the first QoS flow is the created QoS flow, the second rule corresponds to a second QoS flow, the second QoS flow belongs to the at least one QoS flow, and an importance degree of a data packet transmitted by using the first QoS flow is higher than that of a data packet transmitted by using the second QoS flow; and the first rule is a first QoS rule, and the second rule is a first QoS rule; or the first rule is a first data packet detection rule, and the second rule is a second data packet detection rule.

Embodiment 69: According to the communication apparatus according to Embodiment 68, the processing unit is further configured to store a correlation relationship between the first QoS flow and the second QoS flow, to correlate the first QoS flow with the second QoS flow.

Embodiment 70: According to the communication apparatus according to any one of Embodiments 63 to 66, when the quantity of created QoS flows is 1, the processing unit is further configured to: skip setting a corresponding rule for a second QoS flow, and update a first rule corresponding to a first QoS flow, where an updated first rule includes a second field, the second field indicates the second QoS flow, the second QoS flow is the created QoS flow, the first QoS flow belongs to the at least one QoS flow, an importance degree of a data packet transmitted by using the first QoS flow is higher than that of a data packet transmitted by using the second QoS flow, and the first rule is a QoS rule or a data packet detection rule.

Embodiment 71: According to the communication apparatus according to any one of Embodiments 63 to 66, when the quantity of created QoS flows is greater than 1, the processing unit is further configured to set a first rule corresponding to a first QoS flow and a second rule corresponding to a second QoS flow, where the first rule indicates a first-type service, and the second rule indicates a second-type service; an importance degree of the first-type service is higher than that of the second-type service; and the first rule is a first QoS rule, and the second rule is a first QoS rule; or the first rule is a first data packet detection rule, and the second rule is a second data packet detection rule.

Embodiment 72: According to the communication apparatus according to any one of Embodiments 63 to 66, when the quantity of created QoS flows is 1, the processing unit is further configured to: set a first rule corresponding to a first QoS flow, and update a second rule corresponding to a second QoS flow, where the first rule indicates a first-type service, an updated second rule indicates a second-type service, the first QoS flow is the created QoS flow, and the second QoS flow belongs to the at least one QoS flow; or set a second rule corresponding to a second QoS flow, and update a first rule corresponding to a first QoS flow, where an updated first rule indicates a first-type service, the second rule indicates a second-type service, the second QoS flow is the created QoS flow, and the first QoS flow belongs to the at least one QoS flow, where the first rule is a first QoS rule, and the second rule is a first QoS rule; or the first rule is a first data packet detection rule, and the second rule is a second data packet detection rule; and an importance degree of the first-type service is higher than that of the second-type service.

Embodiment 73: According to the communication apparatus according to Embodiment 72, a precedence of the first rule is the same as a precedence of the second rule.

Embodiment 74: According to the communication apparatus according to any one of Embodiments 63 to 73, the communication apparatus further includes a sending unit, where the sending unit is configured to send a second request message to a PCF (or the processing unit is further configured to send a second request message to a PCF through the sending unit), where the second request message is used to request a PCC rule of a terminal device, the second request message further includes second indication information, the second indication information indicates to establish a session that supports the correlated QoS flows, and the correlated QoS flows are used to transmit the traffic flow corresponding to the application; and the receiving unit is further configured to receive the PCC rule from the PCF (or the processing unit is further configured to receive the PCC rule from the PCF through the receiving unit), where the PCC rule indicates whether establishment of the session that supports the correlated QoS flows is allowed.

Embodiment 75: According to the communication apparatus according to Embodiment 74, when the PCC rule indicates that establishment of the session that supports the correlated QoS flows is allowed, the PCC rule further indicates a quantity of QoS flows that are allowed to be established.

Embodiment 76: According to the communication apparatus according to Embodiment 74 or 75, the processing unit is further configured to determine a correlation rule, where the correlation rule indicates information about the traffic flow that allows establishment of the correlated QoS flows.

Embodiment 77: According to the communication apparatus according to Embodiment 76, the information about the traffic flow includes one or more of the following: the IP address, the identifier of the network slice, the transmission bandwidth, the delay requirement, the media coding format, the media type, or the service type.

Embodiment 78: According to the communication apparatus according to Embodiment 76 or 77, the communication apparatus further includes a sending unit, where the sending unit is configured to send the correlation rule to an AMF (or the processing unit is further configured to send the correlation rule to an AMF through the sending unit); and/or the sending unit is configured to send the correlation rule to the terminal device (or the processing unit is further configured to send the correlation rule to the terminal device through the sending unit).

Embodiment 79: According to the communication apparatus according to any one of Embodiments 74 to 78, where the receiving unit is further configured to receive a session establishment request message from the AMF (or the processing unit is further configured to receive a session establishment request message from the AMF through the receiving unit), where the session establishment request message includes first indication information, and the first indication information indicates that the terminal device supports the correlated QoS flows.

Embodiment 80: A communication apparatus includes: a receiving unit, configured to receive request information from a terminal device (or a processing unit, configured to receive request information from a terminal device through a receiving unit), where the request information is used to request to establish a session that supports correlated QoS flows, and the processing unit is configured to select an SMF for the terminal device based on the request information, where the SMF supports the correlated QoS flows.

Embodiment 81: According to the communication apparatus according to Embodiment 80, the request information is carried in an uplink NAS message.

Embodiment 82: According to the communication apparatus according to Embodiment 81, the uplink NAS message further includes a session establishment request message, the session establishment request message includes first indication information, and the first indication information indicates that the terminal device supports the correlated QoS flows.

Embodiment 83: According to the communication apparatus according to Embodiment 82, the first indication information further indicates that the terminal device supports selective packet loss and/or that the terminal device supports semi-persistent scheduling.

Embodiment 84: According to the communication apparatus according to Embodiment 82 or 83, the communication apparatus further includes a sending unit, and the sending unit is configured to send the session establishment request message to the SMF (or the processing unit is further configured to send the session establishment request message to the SMF through the sending unit).

Embodiment 85: According to the communication apparatus according to Embodiment 84, the receiving unit is further configured to receive a session accept indication from the SMF (or the processing unit is further configured to receive a session accept indication from the SMF through the receiving unit), where the session accept indication indicates that a session that supports the correlated QoS flows has been established; and the processing unit is further configured to record the session as the session that supports the correlated QoS flows.

Embodiment 86: According to the communication apparatus according to Embodiment 84 or 85, the receiving unit is further configured to receive a correlation rule from the SMF (or the processing unit is further configured to receive a correlation rule from the SMF through the receiving unit), where the correlation rule indicates information about a traffic flow that allows establishment of the correlated QoS flows.

Embodiment 87: According to the communication apparatus according to Embodiment 86, the information about the traffic flow includes one or more of the following: an IP address, an identifier of a network slice, a transmission bandwidth, a delay requirement, a media coding format, a media type, or a service type.

Embodiment 88: According to the communication apparatus according to Embodiment 86 or 87, the communication apparatus further includes a sending unit, and the sending unit is configured to send the correlation rule to the terminal device (or the processing unit is further configured to send the correlation rule to the terminal device through the sending unit).

Embodiment 89: According to the communication apparatus according to Embodiment 86 or 87, the communication apparatus further includes a sending unit, where the receiving unit is further configured to receive a first request message from the terminal device (or the processing unit is further configured to receive a first request message from the terminal device through the receiving unit), where the first request message is used to request to determine the correlated QoS flows, and the correlated QoS flows are used to transmit the traffic flow corresponding to an application; and the sending unit is configured to send the first request message to the SMF (or the processing unit is further configured to send the first request message to the SMF through the sending unit).

Embodiment 90: According to the communication apparatus according to Embodiment 89, the first request message further indicates a quantity of created QoS flows; and the created QoS flow and at least one established QoS flow are the correlated QoS flows, or the created QoS flows are the correlated QoS flows.

Embodiment 91: An apparatus includes units configured to perform the method described in any embodiment of this application.

What is claimed is:

1. A communication method, comprising:
   receiving a first traffic flow of an application via a single transport layer connection, the first traffic flow corresponding to a first data packet, the receiving of the first traffic flow comprising receiving the first data packet via the transport layer connection; and sending the first traffic flow by using at least two quality of service (QoS) flows, the sending of the first traffic flow comprising:

determining a first rule corresponding to the first data packet, wherein the first rule is a QoS rule or a data packet detection rule; and mapping the first data packet to a QoS flow that is indicated by the first rule and that matches an importance degree of the first data packet for sending, wherein the QoS flow is one of the at least two QoS flows.

2. The method according to claim 1, wherein the at least two QoS flows comprise a first QoS flow and a second QoS flow, an importance degree of a data packet transmitted by using the first QoS flow is higher than that of a data packet transmitted by using the second QoS flow, and the first data packet corresponds to one of an I frame, a P0 frame, a P1 frame, or a P2 frame generated by the application.

3. The method according to claim 2, wherein the first rule indicates the first QoS flow and the second QoS flow, and the importance degree of the data packet transmitted by using the first QoS flow is higher than that of the data packet transmitted by using the second QoS flow.

4. The method according to claim 3, wherein a first field of the first rule indicates the first QoS flow, and a second field of the first rule indicates the second QoS flow.

5. The method according to claim 1, wherein when the first rule is the QoS rule, the QoS rule comprises a first QoS rule and a second QoS rule, wherein the first QoS rule indicates a first QoS flow in the at least two QoS flows, and the second QoS rule indicates a second QoS flow in the at least two QoS flows; or when the first rule is the data packet detection rule, the data packet detection rule comprises a first data packet detection rule and a second data packet detection rule, wherein the first data packet detection rule indicates a first QoS flow in the at least two QoS flows, and the second data packet detection rule indicates a second QoS flow in the at least two QoS flows.

6. The method according to claim 1, wherein the method further comprises:

sending a first request message to a session management function (SMF), wherein the first request message is used to request to determine correlated QoS flows, and the correlated QoS flows are used to transmit a traffic flow corresponding to the application.

7. The method according to claim 6, wherein the first request message further indicates a quantity of created one or more QoS flows; and the created one or more QoS flows and at least one established QoS flow are the correlated QoS flows, or the created one or more QoS flows are the correlated QoS flows.

8. The method according to claim 6, wherein the method further comprises:

receiving a correlation rule, wherein the correlation rule indicates information about the traffic flow that allows establishment of the correlated QoS flows.

9. The method according to claim 1, wherein the method further comprises:

sending first indication information, wherein the first indication information indicates that a terminal device supports correlated QoS flows.

10. The method according to claim 9, wherein an uplink non-access stratum (NAS) message comprises request information, and the request information is used to request to establish a session that supports the correlated QoS flows.

11. The method according to claim 9, wherein the method further comprises:

determining the first indication information according to a user equipment route selection rule (URSP), wherein the URSP indicates that a session type of the application is supporting the correlated QoS flows.

12. A non-transitory computer-readable storage medium, wherein the non-transitory computer-readable storage medium is configured to store a computer program, and when the computer program is run on a computer, the computer is enabled to perform the method according to claim 1.

13. A chip, comprising one or more processors and a communication interface, wherein the one or more processors are configured to read instructions, to perform the method according to claim 1.

14. A communication method, comprising:

receiving a first request message, wherein the first request message comprises information to request to determine correlated quality of service (QoS) flows, and the correlated QoS flows comprise information to transmit a traffic flow of an application via a single transport layer connection; and creating one or more QoS flows based on the first request message, wherein the created one or more QoS flows and at least one established QoS flow are the correlated QoS flows, or the created one or more QoS flows are the correlated QoS flows.

15. The method according to claim 14, wherein the first request message further indicates a quantity of the created one or more QoS flows.

16. The method according to claim 14, wherein the first request message further comprises description information of the created one or more QoS flows; or the first request message further comprises description information of the created one or more QoS flows, and comprises an identifier of the at least one established QoS flow.

17. The method according to claim 16, wherein the description information of the created one or more QoS flows comprises one or more of the following: a 5G quality of service identifier 5QI of the created one or more QoS flows, a guaranteed flow bit rate GFBR of the created one or more QoS flows, a maximum flow bit rate MFBR of the created one or more QoS flows, or an averaging window of the created one or more QoS flows.

18. The method according to claim 14, wherein when a quantity of the created one or more QoS flows is greater than 1, the method further comprises:

setting a first rule corresponding to a first QoS flow, and skipping setting a corresponding rule for a second QoS flow, wherein a first field of the first rule indicates the first QoS flow and a second field of the first rule indicates the second QoS flow, the first QoS flow and the second QoS flow belong to the created one or more QoS flows, an importance degree of a data packet transmitted by using the first QoS flow is higher than that of a data packet transmitted by using the second QoS flow, and the first rule is a QoS rule or a data packet detection rule.

19. The method according to claim 14, wherein when a quantity of the created one or more QoS flows is 1, the method further comprises:

setting a first rule corresponding to a first QoS flow, and deleting QoS mapping information corresponding to the application from a second rule, wherein the first QoS flow is the created one or more QoS flows, the second rule corresponds to a second QoS flow, the second QoS flow belongs to the at least one established QoS flow, and an importance degree of a data packet transmitted by using the first QoS flow is higher than that of a data packet transmitted by using the second QoS flow; and the first rule is a first QoS rule, and the second rule is a second QoS rule; or the first rule is a first data packet detection rule, and the second rule is a second data packet detection rule.

20. A communication device, comprising:

one or more processors;

one or more memories; and one or more computer programs, wherein the one or more computer programs are stored in the one or more memories, the one or more computer programs comprise instructions; and when the instructions are executed by the one or more processors of the communication device, the communication device, when executing the instructions, is configured to:

receive a first traffic flow of an application via a single transport layer connection, the first traffic flow corresponding to a first data packet, the receiving of the first traffic flow comprising receiving the first data packet via the transport layer connection; and send the first traffic flow by using at least two quality of service (QoS) flows, the sending of the first traffic flow comprising:

determine a first rule corresponding to the first data packet, wherein the first rule is a QoS rule or a data packet detection rule, and map the first data packet to a QoS flow that is indicated by the first rule and that matches an importance degree of the first data packet for sending, wherein the QoS flow is one of the at least two QoS flows.

* * * * *